(12) United States Patent
Hu et al.

(10) Patent No.: US 11,264,674 B2
(45) Date of Patent: Mar. 1, 2022

(54) POLYMER COMPOSITE MEMBRANE, PREPARATION METHOD FOR SAME, AND LITHIUM-ION BATTERY INCLUDING SAME

(71) Applicant: BYD Company Limited, Shenzhen (CN)

(72) Inventors: Jialing Hu, Shenzhen (CN); Jun Shan, Shenzhen (CN); Jinxiang Wu, Shenzhen (CN); Long He, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 484 days.

(21) Appl. No.: 16/328,601

(22) PCT Filed: Aug. 14, 2017

(86) PCT No.: PCT/CN2017/097405
§ 371 (c)(1),
(2) Date: Feb. 26, 2019

(87) PCT Pub. No.: WO2018/040904
PCT Pub. Date: Mar. 8, 2018

(65) Prior Publication Data
US 2021/0288381 A1    Sep. 16, 2021

(30) Foreign Application Priority Data
Aug. 29, 2016  (CN) .......................... 201610750354.7

(51) Int. Cl.
| | |
|---|---|
| *H01M 50/417* | (2021.01) |
| *H01M 50/454* | (2021.01) |
| *H01M 50/426* | (2021.01) |
| *H01M 50/491* | (2021.01) |
| *H01M 50/434* | (2021.01) |
| *H01M 50/42* | (2021.01) |

(52) U.S. Cl.
CPC ......... *H01M 50/417* (2021.01); *H01M 50/42* (2021.01); *H01M 50/426* (2021.01); *H01M 50/434* (2021.01); *H01M 50/454* (2021.01); *H01M 50/491* (2021.01)

(58) Field of Classification Search
None
See application file for complete search history.

(56) References Cited

U.S. PATENT DOCUMENTS

| | | | | |
|---|---|---|---|---|
| 4,703,081 | A | * | 10/1987 | Blackwell ............... C08L 79/08 524/592 |
| 2009/0246614 | A1 | * | 10/2009 | Kim ..................... H01M 50/411 429/145 |
| 2010/0233523 | A1 | | 9/2010 | Jo et al. |
| 2011/0020692 | A1 | * | 1/2011 | Ikemoto ............... H01M 10/365 429/144 |
| 2013/0157096 | A1 | * | 6/2013 | Nakagiri ............... H01M 50/46 429/94 |
| 2014/0329131 | A1 | | 11/2014 | Jo et al. |
| 2015/0162588 | A1 | | 6/2015 | Lee et al. |
| 2015/0211175 | A1 | * | 7/2015 | Hino ..................... D04H 1/728 428/394 |
| 2016/0190535 | A1 | * | 6/2016 | Fukuchi ............... H01M 50/411 429/144 |

FOREIGN PATENT DOCUMENTS

| | | | |
|---|---|---|---|
| CN | 102218271 | A | 10/2011 |
| CN | 102569701 | * | 7/2012 |
| CN | 102668173 | | 9/2012 |
| CN | 102832367 | | 12/2012 |
| CN | 102891334 | | 1/2013 |
| CN | 103931021 | A | 7/2014 |
| CN | 104584269 | A | 4/2015 |
| CN | 104752660 | | 7/2015 |
| CN | 104835931 | A | 8/2015 |
| CN | 105304846 | A | 2/2016 |
| JP | 2014532979 | A | 12/2014 |
| JP | 2015524991 | A | 8/2015 |
| KR | 20160054936 | A | 5/2016 |
| WO | 2013115594 | | 8/2013 |
| WO | 2014142450 | A1 | 9/2014 |
| WO | 2016090199 | A1 | 6/2016 |

OTHER PUBLICATIONS

Machine translation of CN 102569701, published on Jul. 11, 2012 (Year: 2012).*
International Search Report from PCT/CN2017/097405 dated Nov. 7, 2017 (4 pages).
Extended Search Report for European Patent Application No. 17845206.6 dated Apr. 25, 2019.
Search Report for Chinese Patent Application No. 2016107503547 dated May 29, 2019.

* cited by examiner

*Primary Examiner* — Anca Eoff
(74) *Attorney, Agent, or Firm* — Calfee, Halter & Griswold

(57) ABSTRACT

The disclosure relates to the field of lithium-ion batteries, and discloses a polymer composite membrane and a method for preparing same. The disclosure further includes a lithium-ion battery for which the foregoing polymer composite membrane is used. The polymer composite membrane includes a porous base membrane and a heat-resistant fiber layer covering at least one side surface of the porous base membrane, where materials of the heat-resistant fiber layer contain a first polymeric material and a second polymeric material.

18 Claims, 1 Drawing Sheet

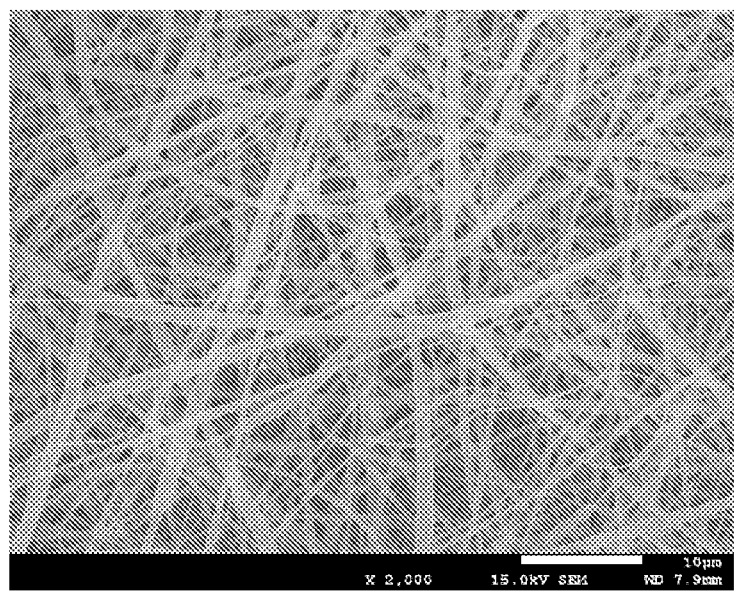

POLYMER COMPOSITE MEMBRANE, PREPARATION METHOD FOR SAME, AND LITHIUM-ION BATTERY INCLUDING SAME

CROSS-REFERENCE TO RELATED APPLICATIONS

This application is a National Stage Entry of PCT Application No. PCT/CN2017/097405, filed on Aug. 14, 2017, which claims priority to and benefits of Chinese Patent Application No. 201610750354.7, filed with the State Intellectual Property Office of P. R. China on Aug. 29, 2016. The entire content of the above-referenced applications are incorporated herein by reference.

FIELD

The disclosure relates to the field of lithium-ion batteries, and specifically, to a polymer composite membrane and a preparation method for same. The disclosure further includes a lithium-ion battery in which the foregoing polymer composite membrane is used.

BACKGROUND

A lithium-ion battery is mainly formed by a positive/negative electrode material, an electrolyte, a membrane, and a battery case packaging material. The membrane is an important component of the lithium-ion battery, and is configured to play a role of separating positive and negative electrodes, to prevent the battery from being internally short-circuited; and allowing ions of the electrolyte to pass freely, to complete an electrochemical charge/discharge process. The performance of the membrane determines the interface structure, the internal resistance, and the like of the battery, and directly affects characteristics of the battery such as the rate performance, the cycle performance, and the safety performance (the high-temperature resistance performance). A membrane whose performance is excellent plays an important role of improving the comprehensive performance of a battery, and is referred to as a "third electrode" of the battery in the industry.

Conventional membrane preparation methods mainly include two main types: a "melt-spinning and cold-stretching method" and a "thermally induced phase separation method", where the preparation principle of the "melt-spinning and cold-stretching method" is: crystallizing a polymer melt such as polyolefin in a high stress field, forming a structure having lamellar crystals arranged in parallel and perpendicular to an extrusion direction, and then obtaining a hard-elastic material through heat treatment. After a hard-elastic polymer membrane is stretched, the lamellar crystals are separated from each other, and a large quantity of microfibers appear. Therefore, a large quantity of microporous structures are formed, and then a microporous membrane is manufactured through heat setting. The "thermally induced phase separation method" is a method for preparing a microporous membrane developed in recent years. In the method, a high polymer such as polyolefin and some small molecule compounds having high boiling points are used to form a homogeneous solution at a relatively high temperature (which is usually higher than the melting temperature Tm of the polymer), and solid-liquid or liquid-liquid phase separation occurs when the temperature is reduced. In this way, an additive phase is contained in a polymer-rich phase, and a polymer phase is contained in an additive-rich phase. After the stretching, if low molecular polymers are removed, microporous membrane materials in communication with each other may be made.

However, for a membrane prepared by using the "melt-spinning and cold-stretching method", although the costs are relatively low and the mechanical strength (toughness and strength) is relatively good, the high-temperature resistance stability (thermal shrinkage) is poor; and for a membrane prepared by using the "thermally induced phase separation method", although the high-temperature resistance stability is improved, the costs are relatively high, and the mechanical strength of the material is deteriorated (hardened), which limits development of the material in the battery field.

The research and development personnel are always seeking a manner that can give consideration to both the mechanical strength and the high-temperature resistance stability of the membrane, so as to adapt to rapid development of the battery industry.

SUMMARY

An objective of the disclosure is to provide a polymer composite membrane, a method for preparing same, and a lithium-ion battery including same, so as to balance mechanical strength and high-temperature thermal stability of the polymer composite membrane.

To achieve the foregoing objective, according to a first aspect of the disclosure, a polymer composite membrane is provided, where the polymer composite membrane includes a porous base membrane and a heat-resistant fiber layer covering at least one side surface of the porous base membrane, where materials of the heat-resistant fiber layer contain a first polymeric material and a second polymeric material; the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

According to a second aspect of the disclosure, a method for preparing a polymer composite membrane is provided, where the preparation method includes the following steps: S1: providing a porous base membrane; and S2: preparing a spinning solution containing a first polymeric material and a second polymeric material, and forming a heat-resistant fiber layer on at least one side surface of the porous base membrane through electrostatic spinning by using the spinning solution, where the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

According to a third aspect of the disclosure, a lithium-ion battery is provided, where the lithium-ion battery includes a positive electrode, a negative electrode, and a battery membrane located between the positive electrode and the negative electrode, and the battery membrane is the polymer composite membrane described in the disclosure.

Application of the polymer composite membrane, the method for preparing same, and the lithium-ion battery including same of the disclosure has the following beneficial effects:

(1) The heat-resistant polymeric material is used as the first polymeric material, to facilitate improvement in the high-temperature resistance performance (transverse/longitudinal thermal shrinkage percentage) of the polymer composite membrane, so that thermal shrinkage of the polymer composite membrane at a high temperature (180° C.) is relatively small, to further facilitate avoidance of contact between the positive and negative electrodes caused by shrinkage of the polymer composite membrane because the battery is heated (for example, caused by tiny short-circuit) cause, thereby ensuring the high-temperature resistance safety performance of the battery.

(2) The second polymeric material whose liquid absorption rate in an electrolyte at 25° C. is above 40% is used, and a characteristic in which the second polymeric material can perform liquid absorption and swelling in the electrolyte and is partially gelatinized is used, so that the gelatinized second polymeric material has a particular viscosity, to further facilitate enhancement in compatibility between the heat-resistant fiber layer and the ceramic layer, and/or between the heat-resistant fiber layer and an outer layer structure (the bonding layer or the positive and negative electrodes) and enhancement in a binding force between the heat-resistant fiber layer and the ceramic layer, and/or between the heat-resistant fiber layer and an outer layer structure (the bonding layer or the positive and negative electrodes), and facilitate improvement in the mechanical performance of the prepared polymer composite membrane at a high temperature.

(3) Both the first polymeric material and the second polymeric material are used, and a characteristic in which the first polymeric material has a relatively high melting point (above 180° C.) and can keep a relatively good strength at a high temperature is used, so that the first polymeric material becomes a backbone of an entire spinning fiber network structure; and the characteristic in which the second polymeric material (whose liquid absorption rate in an electrolyte at 25° C. is above 40%) can perform liquid absorption and swelling in the electrolyte and is partially gelatinized is used, so that the gelatinized second polymeric material has a particular viscosity, and then is attached to the backbone of the spinning fiber network structure formed by the first polymeric material, to play a particular role of enhancing the backbone of the spinning fiber network structure, and then improve the mechanical strength (the transverse stretching strength, the longitudinal stretching strength, and the needling strength) of the heat-resistant fiber layer and the polymer composite membrane.

(4) The heat-resistant fiber layer is formed by using the first polymeric material and the second polymeric material, and this heat-resistant fiber layer has a spinning fiber network structure, so that a substance layer (relatively thin) generated when the second polymeric material is gelatinized is attached to a surface of the first polymeric material, and therefore does not hinder migration of lithium ions, to facilitate maintenance in the ion conductivity of the polymer composite membrane, and then improve the performance of the battery such as the cycle life to a particular extent.

Other features and advantages of the disclosure are described in detail in the subsequent specific implementations.

BRIEF DESCRIPTION OF THE DRAWINGS

The accompanying drawing is used to further understand the disclosure and constitute a part of the specification, and is used to explain the disclosure together with the following specific implementations, but does not constitute a limitation on the disclosure. In the accompanying drawing:

The FIGURE shows a SEM picture of a polymer composite membrane F1 obtained according to Embodiment 1 of the disclosure, where a magnification factor is 2000.

DETAILED DESCRIPTION

Specific implementations of the disclosure are described in detail below. It should be understood that, the specific implementations described herein are used to only describe and explain the disclosure, but are not used to limit the disclosure.

Endpoints of all ranges and all values disclosed in the disclosure are not limited to the precise ranges or values, and these ranges or values should be understood as including values close to these ranges or values. For value ranges, endpoint values of the ranges, an endpoint value of each range and an independent point value, and independent point values may be combined with each other to obtain one or more new value ranges, and these value ranges should be considered as being specifically disclosed herein.

The disclosure provides a polymer composite membrane, where the polymer composite membrane includes a porous base membrane and a heat-resistant fiber layer covering at least one side surface of the porous base membrane, where materials of the heat-resistant fiber layer contain a first polymeric material and a second polymeric material; the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and is optionally 40% to 100% and has an error of ±5%. In the disclosure, the error being ±5% herein means an error existing when the liquid absorption rate of the second polymeric material is measured.

In the disclosure, a method for measuring a "liquid absorption rate" includes: dissolving a to-be-measured material in a corresponding solvent, pouring to form a sample having a designated size (for example, a wafer whose diameter is 17 mm), drying, then weighing the sample of a mass m1 in a glove box (at 25° C.) full of argon, then immersing the sample in an electrolyte (the electrolyte contains a lithium salt $LiPF_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference) for 24 h, then taking out the sample, drying the liquid on the surface of the sample by using filter paper (not performing pressing processing), weighing the sample of a mass m2, and then calculating a corresponding liquid absorption rate according to a calculation formula: "liquid absorption rate=(m2−m1)/m1×100%". In a process of measuring a liquid absorption rate, different operators may have different operation manners for the step of "drying the liquid on the surface of the sample by using the filter paper". This affect may a measurement result, and in the disclosure, an allowable measurement error is ±5%.

According to the polymer composite membrane of the disclosure, in an implementation, a liquid absorption rate of the first polymeric material in an electrolyte at 25° C. is below 5% and has an error of ±5%. By controlling the liquid absorption rate of the first polymeric material, it is favorable to better keep the backbone of the spinning fiber network structure formed by the first polymeric material at a high temperature, and optimize heat-resistant stability (heat-resistant safety) of the prepared polymer composite membrane.

According to the polymer composite membrane of the disclosure, in an implementation, the glass transition temperature of the first polymeric material is above 100° C. By selecting the first polymeric material whose glass transition temperature is above 100° C., it is favorable for the prepared polymer composite membrane to keep a relatively high strength in a temperature increasing process (from a room temperature to 100° C.), so that the second polymeric material that can perform liquid absorption and swelling in the electrolyte and is partially gelatinized can be better bonded onto the backbone of the spinning fiber network structure formed by the first polymeric material, to further optimize heat-resistant stability of the prepared polymer composite membrane.

According to the polymer composite membrane of the disclosure, in an implementation, optionally, the first polymeric material includes but is not limited to one or more of polyetherimide (PEI), poly(ether ether ketone) (PEEK), polyether sulfone (PES), polyamide-imide (PAI), polyamic acid (PAA), and polyvinylpyrrolidone (PVP). The poly(ether ether ketone) (PEEK) includes copoly(ether ether ketone) (CoPEEK) and modified poly(ether ether ketone), provided that the melting point of the poly(ether ether ketone) satisfies the foregoing requirement.

Specifically, the first polymeric material that may be used includes but is not limited to one or more of polyetherimide ultem 1000 (which has a glass transition temperature of 215° C. and a liquid absorption rate of 0.1% in an electrolyte at 25° C.) commercially available from SABIC Innovative Plastics (Shanghai) Co., Ltd., a polyvinylpyrrolidone product (which has a glass transition temperature of 110° C. to 130° C. and a liquid absorption rate of 1% in an electrolyte at 25° C.) with a trade mark K90 commercially available from Hangzhou Sunflower Technology Development Co., Ltd., and a poly(ether ether ketone) product (which has a glass transition temperature of 143° C. and a liquid absorption rate of 0.5% in an electrolyte at 25° C.) with a trade mark ketaspire commercially available from Solvay Corporation.

According to the polymer composite membrane of the disclosure, in an implementation, the melting point of the second polymeric material is 100° C. to 150° C.; and the glass transition temperature of the second polymeric material is below 25° C. By selecting the second polymeric material whose glass transition temperature is relatively low, at a normal use temperature (a room temperature to 40° C.) of a battery, the second polymeric material is already softened, and is bonded onto the backbone of the spinning fiber network structure formed by the first polymeric material, to further optimize heat-resistant stability of the prepared polymer composite membrane. In an implementation, optionally, the second polymeric material includes but is not limited to one or more of modified polyvinylidene fluoride (PVDF), polyacrylate, polyphenyl ethylene, and polyethylene oxide (PEO).

It should be noted that, in the disclosure, the foregoing types of raw materials (modified polyvinylidene fluoride, polyacrylate, polyphenyl ethylene, and polyethylene oxide) may be used as the second polymeric material, but a precondition is that the used raw material needs to satisfy the requirement of the disclosure for the liquid absorption rate of the second polymeric material. Using polyvinylidene fluoride as an example, the liquid absorption rate of unmodified polyvinylidene fluoride is usually 10% to 20%, and does not conform to the use requirement of the disclosure, and modified polyvinylidene fluoride such as polyvinylidene fluoride-hexafluoropropylene (PVDF-HFP) that is modified so that the liquid absorption rate satisfies the foregoing requirement is selected in the disclosure; and using polyacrylate as an example, polyacrylate whose liquid absorption rate satisfies the foregoing requirement includes but is not limited to polymethyl acrylate, polymethyl methacrylate, and polyethylene acrylate.

Specifically, the second polymeric material that may be used includes but is not limited to one or more of a PVDF-HFP product (which has a glass transition temperature of −55° C. to −40° C. and a liquid absorption rate of 45% to 60% in an electrolyte at 25° C.) with a trade mark LBG commercially available from Arkema Corporation, a polyethylene oxide product (which has a glass transition temperature of −65° C. and a liquid absorption rate of 1000% in an electrolyte at 25° C., where Mw=600000) commercially available from Aladdin Corporation, and a polymethyl methacrylate product (which has a liquid absorption rate of 55% in an electrolyte at 25° C.) commercially available from Aladdin Corporation. Optionally, a liquid absorption rate of the second polymeric material in an electrolyte at 25° C. is 40% to 100% and has an error of ±5%.

According to the polymer composite membrane of the disclosure, selection for a material in the heat-resistant fiber layer is not limited. Based on use of both the first polymeric material and the second polymeric material, other raw materials such as nanometer ceramic particles may be further properly added with reference to a regular material use requirement in the field. Certainly, in the disclosure, the materials of the heat-resistant fiber layer may be formed by a mixture of the first polymeric material and the second polymeric material. By using the mixture of the first polymeric material and the second polymeric material to prepare the heat-resistant fiber layer of the polymer composite membrane of the disclosure, the effect that the disclosure intends to achieve can be achieved relatively well.

According to the polymer composite membrane of the disclosure, a weight ratio of the first polymeric material to the second polymeric material in the heat-resistant fiber layer may be random, provided that based on using the particular first polymeric material as a main raw material, the objective of the disclosure can be achieved to a particular extent by adding some second polymeric material. However, in comprehensive consideration of temperature resistant stability, strength, and toughness of the entire polymer composite membrane, in the disclosure, optionally, a weight ratio of the first polymeric material to the second polymeric material in the heat-resistant fiber layer is (0.5 to 10):1, is optionally (1 to 5):1, and is optionally (1 to 3):1.

According to the polymer composite membrane of the disclosure, in an implementation, in the heat-resistant fiber layer, the first polymeric material is polyetherimide, and the second polymeric material is polyvinylidene fluoride-hexafluoropropylene; and the materials of the heat-resistant fiber layer are a mixture of polyetherimide and polyvinylidene fluoride-hexafluoropropylene. Polyetherimide is characterized in that polyetherimide can keep a relatively good strength at a high temperature, so that polyetherimide becomes the backbone of the entire spinning fiber network structure, and polyvinylidene fluoride-hexafluoropropylene can perform liquid absorption and swelling in an electrolyte, and has a gelatinization characteristic and therefore has bonding performance to some extent, and then can be quite well attached to the backbone of the spinning fiber network structure formed by polyetherimide, thereby playing a role of enhancing on the backbone of the spinning fiber network structure, and further improving the mechanical strength of a first heat-resistant fiber layer and the polymer composite membrane.

According to the polymer composite membrane of the disclosure, in an implementation, in the foregoing polymer composite membrane, the porosity of the heat-resistant fiber layer is above 70%, and optionally the porosity of the heat-resistant fiber layer is 70% to 95%, for example, 75% to 95%. The porosity of the heat-resistant fiber layer is high, so that the ion conductivity of the polymer composite membrane may be effectively ensured. In the disclosure, a manner of measuring the porosity of the heat-resistant fiber layer is: preparing a heat-resistant fiber layer sample of a particular size, weighing, then immersing the heat-resistant fiber layer sample in isobutanol, measuring the weight of the sample after adsorption and balancing, and then calculating the porosity of the heat-resistant fiber layer by using a formula:

$$\frac{\text{Mass after adsorption} - \text{Mass before adsorption}}{\rho_{isobutanol}\text{Sample volume}} \times 100\%.$$

According to the polymer composite membrane of the disclosure, in an implementation, the surface density of the heat-resistant fiber layer is 0.2 g/m$^2$ to 15 g/m$^2$, and is optionally 3 g/m$^2$ to 6 g/m$^2$. The surface density of the heat-resistant fiber layer is the mass of a substance applied onto a base material membrane on a unit area. In the disclosure, when the surface density of the heat-resistant fiber layer falls within the foregoing range, the conductivity may be effectively ensured without affecting migration of lithium ions, and better bonding performance is provided, to facilitate improvement in the safety performance of the battery.

According to the polymer composite membrane of the disclosure, the thickness of the heat-resistant fiber layer and the diameter of fiber in the heat-resistant fiber layer are not specially limited, and in an implementation, the single-sided thickness of the heat-resistant fiber layer is 0.5 μm to 30 μm, and is optionally 1 μm to 20 μm; and in an implementation, the diameter of the fiber is 100 nm to 2000 nm. In the disclosure, when the thickness of the heat-resistant fiber layer falls within the foregoing range, the positive and negative electrodes and the membrane may be effectively bonded, thereby improving the cycle performance of the battery.

According to the polymer composite membrane of the disclosure, the heat-resistant fiber layer may be formed on one side surface of the porous base membrane, or formed on two side surfaces of the porous base membrane. In an implementation, the heat-resistant fiber layer is formed on each of two side surfaces of the porous base membrane.

According to the polymer composite membrane of the disclosure, the porous base membrane may be a polymer base membrane, or may be a ceramic membrane, where a polyolefin membrane generally used for a lithium-ion battery may be used as the polymer base membrane, for example, includes but is not limited to a polypropylene (PP) membrane, a polyethylene (PE) membrane, and a PE/PP/PE three-layered membrane; and the ceramic membrane is the same as a regular ceramic membrane in the field, and includes a polymer base membrane (which is the same as the foregoing polymer base membrane) and a ceramic layer disposed on at least one side surface of the polymer base membrane.

According to the polymer composite membrane of the disclosure, in an implementation, the porous base membrane is a ceramic membrane, where no special requirement is imposed on a ceramic layer in the ceramic membrane, and a regularly used ceramic layer in the field may be selected. However, the inventor of the disclosure finds through in-depth research that, in the prior art, a ceramic layer of a ceramic membrane is usually intentionally or unintentionally fabricated to have low density and high porosity. In this way, the air permeability of the ceramic membrane may be greatly increased, but it is difficult for such a ceramic membrane to be high-temperature resistant, and obvious thermal shrinkage usually occurs in the ceramic membrane above 160° C. to affect the safety performance of the battery. Moreover, it is mentioned in CN105355825A that the surface density of a ceramic layer may be controlled to be between 0.2 mg/cm$^2$ and 1.8 mg/cm$^2$ to improve the pressure resistant performance and the ion permeation performance of the ceramic layer, but a thickness factor is not eliminated for the surface density, that is, the surface density of the ceramic layer may be increased because the ceramic layer is thicken but not because the ceramic layer is accumulated more densely. Such an increase in the surface density may improve the safety by improving the thermal resistance of the ceramic membrane, but the high-temperature resistance and shrinkage resistance performance of the ceramic membrane is not ideal, and the increase in the thickness unfavorably affects the capacity of the battery.

The inventor of the disclosure further finds through in-depth research that, when the surface density p of the ceramic layer of the ceramic membrane at a unit thickness (1 μm) is controlled to be 1.8 mg/cm$^2$<p≤2.7 mg/cm$^2$, the corresponding ceramic membrane has quite excellent high-temperature resistance and thermal-shrinkage resistance performance. Based on this, in the disclosure, optionally the ceramic layer contains ceramic particles and a binder, and the surface density p of the ceramic layer at a unit thickness (1 μm) satisfies 1.8 mg/cm$^2$<p≤2.7 mg/cm$^2$, optionally satisfies 1.85 mg/cm$^2$≤p≤2.65 mg/cm$^2$, and optionally satisfies 1.9 mg/cm$^2$≤p≤2.6 mg/cm$^2$.

In the method for preparing a ceramic membrane provided in the disclosure, optimized dispersion of ceramic particles is implemented by controlling the use amount of each component in the ceramic layer slurry, the number-average molecular weight of the dispersant, and the rotational speed for forming the ceramic layer slurry, thereby controlling the density of accumulation between the ceramic particles to control the surface density of the ceramic layer at a unit thickness (1 μm) to be 1.8 mg/cm$^2$<p≤2.7 mg/cm$^2$. In this way, the high-temperature resistance and thermal-shrinkage resistance performance of the ceramic membrane can be improved on the basis of basically not reducing the air permeability, so that the heat-resistant temperature of the ceramic membrane is above 160° C., that is, the thermal stability of the ceramic membrane is improved without increasing the thickness of the ceramic layer, so as not to affect the energy density of the battery.

According to the polymer composite membrane of the disclosure, in an implementation, in the ceramic layer, relative to the ceramic particles of 100 parts by weight, the content of the binder is 2 to 8 parts by weight, and is optionally 4 to 6 parts by weight. When the content of each substance in the ceramic layer is controlled to be within the foregoing optional range, the obtained ceramic membrane is enabled to have better high-temperature resistance and thermal-shrinkage resistance performance and air permeability.

According to the polymer composite membrane of the disclosure, the type of the ceramic particles may be regularly selected in the field, for example, may be selected from one or more of $Al_2O_3$, $SiO_2$, $BaSO_4$, BaO, $TiO_2$, CuO, MgO, $Mg(OH)_2$, $LiAlO_2$, $ZrO_2$, carbon nanotube (CNT), BN, SiC, $Si_3N_4$, WC, $B_4C$, AlN, $Fe_2O_3$, $BaTiO_3$, $MoS_2$, $\alpha$-$V_2O_5$, $PbTiO_3$, $TiB_2$, $CaSiO_3$, molecular sieve, clay, boehmite, and kaolin. Moreover, an average particle size of the ceramic particle is optionally 200 nm to 800 nm, and is optionally 300 nm to 600 nm, thereby not only facilitating avoidance of coagulation of the slurry used for the ceramic layer, but also facilitating improvement in the air permeability of the ceramic membrane.

According to the polymer composite membrane of the disclosure, the type of the binder in ceramic layer is not particularly limited, and the binder may be various existing substance that can be used to improve the strength of the ceramic membrane, for example, may be at least one of polyacrylate (an optional weight-average molecular weight $M_w$ is $1\times10^4$ g/mol to $1\times10^6$ g/mol), a copolymer of polyvinylidene fluoride and hexafluoropropylene (an optional weight-average molecular weight $M_w$ is $1\times10^4$ g/mol to $1\times10^6$ g/mol), a copolymer of polyvinylidene fluoride and trichloro ethylene (an optional weight-average molecular weight $M_w$ is $1\times10^4$ g/mol to $1\times10^6$ g/mol), polyacrylonitrile (an optional weight-average molecular weight $M_w$ is $1\times10^4$ g/mol to $1\times10^6$ g/mol), polyvinyl pyrrolidone (an optional weight-average molecular weight $M_w$ is $1\times10^5$ g/mol to $1\times10^6$ g/mol), polyimide (an optional weight-average molecular weight $M_w$ is $1\times10^4$ g/mol to $1\times10^6$ g/mol), polyvinyl alcohol (an optional weight-average molecular weight $M_w$ is $1\times10^3$ g/mol to $1\times10^5$ g/mol), and the like, is optionally polyacrylate, and is optionally polyacrylate whose glass transition temperature satisfies $-40°$ C. to $0°$ C. The polyacrylate whose glass transition temperature satisfies $-40°$ C. to $0°$ C. may be specifically at least one of a homopolymer, a copolymer, and the like of methylmethacylate, ethylmethacrylate, butylmethacrylate, and hexylmethacrylate. When the polyacrylate whose glass transition temperature satisfies $-40°$ C. to $0°$ C. is used as the binder, the manufacturing performance of the ceramic membrane can be improved without affecting the bonding strength of the ceramic membrane, to have a better industrial application prospect. Moreover, optionally, a crosslinked monomer such as methyl methacrylate and/or methylolacrylamide is introduced into the foregoing polyacrylate binder, and the content of the crosslinked monomer is optionally controlled to be within 8 wt %, and is optionally controlled to be 3 wt % to 5 wt %. In this way, the polyacrylate binder may be mildly crosslinked, thereby improving the water resistance of the ceramic membrane and increasing the bonding strength of the ceramic layer.

According to the polymer composite membrane of the disclosure, in an implementation, in the ceramic layer, relative to the ceramic particles of 100 parts by weight, a binder of 2 to 8 parts by weight, a dispersant of 0.3 to 1 part by weight, a thickener of 0.5 to 1.8 parts by weight, and a surface treating agent of 0 to 1.5 parts by weight are further included, and the number-average molecular weight of the dispersant is below 50000; optionally, in the ceramic layer, relative to the ceramic particles of 100 parts by weight, the use amount of the binder is 4 to 6 parts by weight, the use amount of the dispersant is 0.4 to 0.8 part by weight, the use amount of the thickener is 0.7 to 1.5 parts by weight, and the use amount of the surface treating agent is 0 to 1.5 parts by weight, and the number-average molecular weight of the dispersant is 5000 g/mol to 20000 g/mol.

According to the polymer composite membrane of the disclosure, the type of the dispersant in the ceramic layer is not particularly limited, and the dispersant may be various existing substances that are helpful to dispersion of each substance in the ceramic layer slurry and whose number-average molecular weight is below 50000, is optionally at least one of polyacrylate, polyglycol ether, silicates, phosphates, and guar gum, and is optionally at least one of polyacrylate, aliphatic polyglycol ether, and phosphates. The polyacrylate may be, for example, at least one of potassium polyacrylate, sodium polyacrylate, lithium polyacrylate, and the like. The aliphatic polyglycol ether may be, for example, polyethylene glycol tert-octylphenyl ether and/or polyethylene glycol monooleyl ether. The phosphates may be, for example, sodium tripolyphosphate and/or sodium hexametaphosphate.

According to the polymer composite membrane of the disclosure, the type of the thickener in the ceramic layer is not particularly limited, and the thickener is optionally at least one of polyacrylate, a polyacrylate copolymer, polyvinylpyrrolidone, a cellulose derivative, and polyacrylamide, and is optionally at least one of polyacrylate, a polyacrylate copolymer, and a cellulose derivative. The polyacrylate may be, for example, at least one of potassium polyacrylate, sodium polyacrylate, lithium polyacrylate, and the like. The polyacrylate copolymer may be, for example, at least one of a copolymer of acrylic acid and styrene, a copolymer of acrylic acid and ethyl acrylate, a copolymer of acrylic acid and ethylene, and the like. The cellulose derivative may be, for example, at least one of sodium carboxymethylcellulose, potassium carboxymethylcellulose, hydroxyethyl cellulose, and the like. Moreover, the viscosity of the thickener in an aqueous solution of 1 wt % is 1500 mPa·s to 7000 mPa·s. In this way, the thickener not only can be quite well dispersed in the ceramic layer slurry, but also can be favorable to applying, and more favorable to improvement in the surface density. Moreover, each of the dispersant and the thickener may be polyacrylate, but, the number-average molecular weight of polyacrylate used as the thickener is far greater than the molecular weight of polyacrylate used as the dispersant, the number-average molecular weight of the polyacrylate used as the thickener is usually 300000 to 1500000, and the number-average molecular weight of the polyacrylate used as the dispersant is below 50000.

According to the polymer composite membrane of the disclosure, the type of the surface treating agent in the ceramic layer is not particularly limited, and the surface treating agent is optionally 3-glycidyloxypropyltrimethoxysilane and/or 3-glycidyloxypropyltriethoxysilane. In this way, interaction between the ceramic particles and the binder can be further improved, to enhance the strength of the ceramic membrane.

According to the polymer composite membrane of the disclosure, in an implementation, the thickness of the polymer base membrane in the ceramic membrane is 5 μm to 30 μm, and is optionally 6 μm to 25 μm. Moreover, the single-sided thickness of the ceramic layer is optionally 1 μm to 5 μm, and is optionally 2 μm to 3.5 μm, so as to be more favorable to improvement in the high-temperature resistance and thermal-shrinkage resistance performance of the ceramic membrane and improvement in the air permeability.

According to the polymer composite membrane of the disclosure, in an implementation, the ceramic layer in the ceramic membrane may be formed on one side surface of the polymer base membrane, or formed on two side surfaces of the polymer base membrane. In an implementation, the ceramic layer is formed on each of two side surfaces of the polymer base membrane.

According to the polymer composite membrane of the disclosure, in an implementation, the polymer composite membrane further includes a bonding layer, where the bonding layer is formed on at least an outermost layer of one side surface of the polymer composite membrane, and optionally the bonding layer is formed on outermost layers of two side surfaces of the polymer composite membrane; and formation of the bonding layer can improve the viscosity between the polymer composite membrane and the positive and negative electrodes, increase the disposition stability of the polymer composite membrane, and improve the safety performance of the battery. Optionally, in the disclosure, the bonding layer contains an acrylate crosslinked polymer and a styrene-acrylate crosslinked copolymer and/or a vinylidene fluoride-hexafluoropropylene copolymer, what means, the bonding layer contains an acrylate crosslinked polymer and a styrene-acrylate crosslinked copolymer, or the bonding layer contains an acrylate crosslinked polymer and a vinylidene fluoride-hexafluoropropylene copolymer, or the bonding layer contains an acrylate crosslinked polymer, a styrene-acrylate crosslinked copolymer and a vinylidene fluoride-hexafluoropropylene copolymer, and the porosity of the bonding layer is 40% to 65%. When the ceramic membrane further includes the foregoing particular bonding layer, the ceramic membrane not only has good high-temperature resistance and thermal-shrinkage resistance performance, but also has higher bonding strength and ion conductivity.

That "the first bonding layer contains an acrylate crosslinked polymer and a styrene-acrylate crosslinked copolymer and/or a vinylidene fluoride-hexafluoropropylene copolymer" means that the bonding layer contains an acrylate crosslinked polymer and a styrene-acrylate crosslinked copolymer and does not contain a vinylidene fluoride-hexafluoropropylene copolymer, or contains an acrylate crosslinked polymer and a vinylidene fluoride-hexafluoropropylene copolymer and does not contain a styrene-acrylate crosslinked copolymer, or contains an acrylate crosslinked polymer, a styrene-acrylate crosslinked copolymer, and a vinylidene fluoride-hexafluoropropylene copolymer. Moreover, "containing a self-crosslinking pure acrylic emulsion and a self-crosslinking styrene acrylic emulsion and/or a copolymer emulsion of vinylidene fluoride and hexafluoropropylene" may also be similarly explained.

According to the polymer composite membrane of the disclosure, the acrylate crosslinked polymer is a polymer obtained by performing cross-linking polymerization on reaction-type acrylate monomers. The crosslinking degree of the acrylate crosslinked polymer may be 2% to 30%, and is optionally 5% to 20%. In the disclosure, the crosslinking degree is the percentage of the weight of the crosslinked polymer to the total weight of the polymer. Moreover, the glass transition temperature of the acrylate crosslinked polymer is optionally −20° C. to 60° C., and is optionally −12° C. to 54° C. According to an implementation of the disclosure, the acrylate crosslinked polymer is a mixture of a first acrylate crosslinked polymer and a second acrylate crosslinked polymer and/or a third acrylate crosslinked polymer, or a second acrylate crosslinked polymer, or a third acrylate crosslinked polymer, where the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the glass transition temperature of the first acrylate crosslinked polymer is 50° C. to 60° C., the glass transition temperature of the second acrylate crosslinked polymer is −20° C. to −5° C., and the glass transition temperature of the third acrylate crosslinked polymer is 30° C. to 50° C.

According to the polymer composite membrane of the disclosure, the styrene-acrylate crosslinked copolymer is a copolymer obtained by copolymerizing a styrene monomer and a reaction-type acrylate monomer. A weight ratio of a styrene structure unit to an acrylate structure unit in the styrene-acrylate crosslinked copolymer may be (0.5 to 2):1, and is optionally (0.67 to 1.5):1. The crosslinking degree of the styrene-acrylate crosslinked copolymer may be 2% to 30%, and is optionally 5% to 20%. Moreover, the glass transition temperature of the styrene-acrylate crosslinked copolymer is optionally −30° C. to 50° C., and is optionally −20° C. to 50° C. According to an implementation of the disclosure, the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; and the glass transition temperature of the styrene-acrylate crosslinked copolymer is 15° C. to 30° C.

According to the polymer composite membrane of the disclosure, the glass transition temperature of the vinylidene fluoride-hexafluoropropylene copolymer is optionally −65° C. to −40° C., and is optionally −60° C. to −40° C. According to an implementation of the disclosure, the vinylidene fluoride-hexafluoropropylene copolymer contains a polyvinylidene fluoride chain segment of 80 to 98 wt % and a polyhexafluoropropylene chain segment of 2 to 20 wt %, and optionally contains a polyvinylidene fluoride chain segment of 90 to 96 wt % and a polyhexafluoropropylene chain segment of 4 to 10 wt %; and the glass transition temperature of the vinylidene fluoride-hexafluoropropylene copolymer is −60° C. to −40° C.

According to the polymer composite membrane of the disclosure, in an implementation, the bonding layer contains the acrylate crosslinked polymer and the styrene-acrylate crosslinked copolymer and does not contain the vinylidene fluoride-hexafluoropropylene copolymer, and a weight ratio of the acrylate crosslinked polymer to the styrene-acrylate crosslinked copolymer is 1:(0.05 to 2), and is optionally 1:(1 to 2); or the bonding layer contains the acrylate crosslinked polymer and the vinylidene fluoride-hexafluoropropylene copolymer and does not contain the styrene-acrylate crosslinked copolymer, and a weight ratio of the acrylate crosslinked polymer to the vinylidene fluoride-hexafluoropropylene copolymer is 1:(0.3 to 25), and is optionally 1:(0.4 to 19); or the bonding layer contains the acrylate crosslinked polymer, the styrene-acrylate crosslinked copolymer, and the vinylidene fluoride-hexafluoropropylene copolymer, and a weight ratio between the acrylate crosslinked polymer, the styrene-acrylate crosslinked copolymer and the vinylidene fluoride-hexafluoropropylene copolymer is 1:(0.01 to 2):(0.3 to 5), and is optionally 1:(0.05 to 1.5):(0.45 to 3). The inventor of the disclosure finds through in-depth research that, when the foregoing several polymers are cooperatively used according to the foregoing particular proportion, it is quite favorable to improvement in the liquid absorption rate and the conductivity of the polymer composite membrane and improvement in the manufacturing performance.

According to the polymer composite membrane of the disclosure, in an implementation, the bonding layer contains a first acrylate crosslinked polymer, a second acrylate crosslinked polymer, and the styrene-acrylate crosslinked copolymer and does not contain the vinylidene fluoride-hexafluoropropylene copolymer, and a weight ratio between the first acrylate crosslinked polymer the second acrylate crosslinked polymer and the styrene-acrylate crosslinked copolymer is (5 to 10):1:(10 to 13); or the bonding layer contains the first acrylate crosslinked polymer, the second acrylate crosslinked polymer, and the vinylidene fluoride-hexafluoropropylene copolymer and does not contain the styrene-acrylate crosslinked copolymer, and a weight ratio between the first acrylate crosslinked polymer, the second acrylate crosslinked polymer and the vinylidene fluoride-hexafluoropropylene copolymer is (5 to 15):1:(5 to 12); or the bonding layer contains the second acrylate crosslinked polymer and the vinylidene fluoride-hexafluoropropylene copolymer and does not contain the styrene-acrylate crosslinked copolymer, and a weight ratio of the second acrylate crosslinked polymer to the vinylidene fluoride-hexafluoropropylene copolymer is 1:(5 to 20); or the bonding layer contains the second acrylate crosslinked polymer, the styrene-acrylate crosslinked copolymer, and the vinylidene fluoride-hexafluoropropylene copolymer, and a weight ratio between the second acrylate crosslinked polymer, the styrene-acrylate crosslinked copolymer and the vinylidene fluoride-hexafluoropropylene copolymer is 1:(0.5 to 2):(1 to 5); or the bonding layer contains the third acrylate crosslinked polymer, the styrene-acrylate crosslinked copolymer, and the vinylidene fluoride-hexafluoropropylene copolymer, and a weight ratio between the third acrylate crosslinked polymer, the styrene-acrylate crosslinked copolymer and the vinylidene fluoride-hexafluoropropylene copolymer is 1:(0.5 to 2):(1 to 5); or the bonding layer contains the first acrylate crosslinked polymer, the second acrylate crosslinked polymer, the styrene-acrylate crosslinked copolymer, and the vinylidene fluoride-hexafluoropropylene copolymer, and a weight ratio between the first acrylate crosslinked polymer, the second acrylate crosslinked polymer, the styrene-acrylate crosslinked copolymer and the vinylidene fluoride-hexafluoropropylene copolymer is (10 to 15):1:(0.5 to 2):(5 to 10), where the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer contains a polyvinylidene fluoride chain segment of 80 to 98 wt % and a polyhexafluoropropylene chain segment of 2 to 20 wt %; and the glass transition temperature of the first acrylate crosslinked polymer is 50° C. to 60° C., the glass transition temperature of the second acrylate crosslinked polymer is −20° C. to −5° C., the glass transition temperature of the third acrylate crosslinked polymer is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

According to the polymer composite membrane of the disclosure, in an implementation, the bonding layer further contains at least one of an acrylonitrile-acrylate copolymer, a vinyl chloride-propylene copolymer, and a butadiene-styrene copolymer. When the bonding layer further contains an acrylonitrile-acrylate copolymer, it is favorable to improvement in the ion conductivity of the polymer composite membrane inside the battery; and when the bonding layer further contains a vinyl chloride-propylene copolymer and/or a butadiene-styrene copolymer, it is favorable to reduction in the liquid absorption rate of the polymer composite membrane, so that the liquid absorption rate cannot go so far as to be excessively high. If the liquid absorption rate is excessively high, the positive electrode and the negative electrode inside the battery are lack of an electrolyte and consequently the performance of the battery is deteriorated.

When the bonding layer further contains the acrylonitrile-acrylate copolymer, a weight ratio of the acrylonitrile-acrylate copolymer to the acrylate crosslinked polymer is optionally (0.05 to 2):1, and is optionally (0.08 to 1.85):1. When the bonding layer further contains the vinyl chloride-propylene copolymer, a weight ratio of the vinyl chloride-propylene copolymer to the acrylate crosslinked polymer is optionally (0.15 to 7):1, and is optionally (0.2 to 6):1. When the bonding layer further contains the butadiene-styrene copolymer, a weight ratio of the butadiene-styrene copolymer to the acrylate crosslinked polymer is optionally (0.05 to 2):1, and is optionally (0.08 to 1.85):1.

Moreover, the single-sided surface density of the bonding layer is optionally 0.05 mg/cm$^2$ to 0.9 mg/cm$^2$, and is optionally 0.1 mg/cm$^2$ to 0.6 mg/cm$^2$. The single-sided thickness of the bonding layer is optionally 0.1 μm to 1 μm, and is optionally 0.2 μm to 0.6 μm.

Moreover, the disclosure further provides a method for preparing a polymer composite membrane, where the preparation method includes the following steps: S1: providing a porous base membrane; and S2: preparing a spinning solution containing a first polymeric material and a second polymeric material, and forming a heat-resistant fiber layer on at least one side surface of the porous base membrane through electrostatic spinning by using the spinning solution, where the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

Optionally, a liquid absorption rate of the first polymeric material in an electrolyte at 25° C. is below 5% and has an error of ±5%;

optionally, the glass transition temperature of the first polymeric material is above 100° C.;

optionally, the melting point of the second polymeric material is 100° C. to 150° C.; and optionally, the glass transition temperature of the second polymeric material is below 25° C.;

optionally, a liquid absorption rate of the second polymeric material in an electrolyte at 25° C. is 40% to 100% and has an error of ±5%; and optionally, in the spinning polymer, a weight ratio of the first polymeric material to the second polymeric material is (0.5 to 10):1, is optionally (1 to 5):1, and is optionally (1 to 3):1.

According to the preparation method of the disclosure, the following method may be further used in step S2: preparing a spinning solution containing a first polymeric material and a second polymeric material, forming a heat-resistant fiber layer through electrostatic spinning on a substrate by using the spinning solution, and then compounding the formed heat-resistant fiber layer onto at least one side surface of the porous base membrane.

According to the preparation method of the disclosure, the following steps may be taken in step S2: S201: respectively independently preparing a spinning solution A containing the first polymeric material and a spinning solution B containing the second polymeric material; and S202: performing electrostatic spinning by using the spinning solution A and the spinning solution B. In this case, the formed heat-resistant fiber layer contains both the first polymeric material and the second polymeric material.

According to the method for preparing a polymer composite membrane, the following steps may alternatively be taken in step S2: S211: mixing the first polymeric material and the second polymeric material (an optional mixing condition includes: mixing for 2 h to 6 h under a condition of a normal temperature and a rotational speed of 300 to 2000 rpm), to form a mixture; and then preparing a spinning solution containing the mixture; and S212: performing electrostatic spinning by using the spinning solution to form the heat-resistant fiber layer. In this case, the materials of the heat-resistant fiber layer are a mixture of the first polymeric material and the second polymeric material.

According to the preparation method of the disclosure, in an implementation, the first polymeric material and the second polymeric material are mixed in a weight ratio of (0.5 to 10):1, optionally (1 to 5):1, and particularly optionally (1 to 3):1. The method in which the spinning solution is prepared to perform spinning after the first polymeric material and the second polymeric material are mixed to form a mixture has the effect of forming a fiber-shaped network structure, to be favorable to improvement in the thermal stability of the polymer composite membrane.

According to the preparation method of the disclosure, the first polymeric material and the second polymeric material in the foregoing spinning solution are dissolved by using a solvent, so as to smoothly implement a subsequent electrostatic spinning process. In the disclosure, the solvent is selected from one or more of acetone, N,N-dimethylacetamide, N,N-dimethylacetamide, N-methypyrrolidone, toluene, and the like.

According to the preparation method of the disclosure, the foregoing spinning solution (including the spinning solution A, the spinning solution B, and the spinning solution containing the mixture of the first polymeric material and the second polymeric material) is used to prepare the heat-resistant fiber layer through an electrostatic spinning method in a subsequent step. Therefore, in the spinning solution, the concentration range of the spinning polymer (including the first polymeric material and/or the second polymeric material) is the concentration range in which spinning may be performed by using the electrostatic spinning method. In an implementation, in the disclosure, in step S2, in the spinning solution, the concentration of the spinning polymer is 3 wt % to 30 wt %, and is optionally 8 wt % to 20 wt %. When the relative molecular mass of the spinning polymer is fixed, if other conditions are determined, the concentration of the spinning solution is a decisive factor of affecting intertwining of a molecular chain in the solution. Polymer solutions may be divided into a polymer dilute solution, a semi-dilute solution, and a concentrated solution according to different concentrations and molecular chain morphologies. In the dilute solution, molecular chains are separated from each other and distributed evenly, and as the concentration of the solution is increased, molecular chains are intermixed and overlapped with each other, and are intertwined. A dividing concentration between the dilute solution and the semi-dilute solution is referred to as a contact concentration, and is a concentration in which molecular chains are in contact with each other and are subsequently overlapped as the concentration of the solution is increased. A dividing concentration between the semi-dilute solution and the concentrated solution is referred to as an intertwining concentration, and is a concentration in which molecular chains are intermixed with each other and intertwined with each other as the concentration of the solution is further increased. In the disclosure, when the concentration of the spinning solution falls within the foregoing range, the filamentation performance may be effectively ensured. Moreover, as the concentration of the spinning solution is increased, the polymer intertwining degree is increased, and the filamentation performance is better. In the disclosure, when spinning solutions containing different polymers are used to perform electrostatic spinning, the concentration of each spinning solution is independently selected from the foregoing concentration range.

According to the preparation method of the disclosure, the method for preparing the heat-resistant fiber layer in step S3 is electrostatic spinning, and the basic principle of the electrostatic spinning is well known by a person skilled in the art, and is specifically: applying a voltage between an ejection device and an acceptance device, forming a jet stream from a spinning solution originating from a pyramidal end portion of the ejection device, stretching the jet stream in an electric field, and finally forming fiber on the acceptance device. The acceptance device includes a roller (rotatable) or a receiving plate. The electrostatic spinning method usually includes a needle spinning method and a needleless spinning method, and each specific process is well known by a person skilled in the art. Details are not described herein.

When the electrostatic spinning method is the needle spinning method, the stream velocity of the spinning solution is optionally 0.3 mL/h to 5 mL/h, and is optionally 0.6 mL/h to 2 mL/h; the spinning temperature is optionally 25° C. to 70° C., and is optionally 30° C. to 50° C.; the spinning humidity is optionally 2% to 60%, and is optionally 2% to 50%; and the spinning voltage is optionally 5 kV to 25 kV, and is optionally 8 kV to 20 kV. When the stream velocity falls within the foregoing optional range, it may be ensured that an appropriate fiber diameter is obtained, and the needle may be effectively prevented from being jammed, to ensure smooth spinning. Particularly, on the premise that the mixed solvent provided in the disclosure is used, if the stream velocity is controlled to fall within the foregoing range, a heat-resistant fiber layer having excellent porosity and bonding performance may be obtained. When the spinning temperature and the spinning humidity fall within the foregoing range, in cooperation with the foregoing mixed solvent, it is ensured that fiber obtained through spinning is smoothly filamented and then dried, to prevent the fiber from being subject to adhesion which causes decrease in the porosity, and the bonding performance of the heat-resistant fiber layer may be prevented from being decreased. When the voltage falls within the foregoing range, the spinning solution may be effectively motivated to form a jet stream, thereby generating an effective stretching effect in the electric field, obtaining fiber whose diameter is appropriate, ensuring the morphology of the formed fiber, and facilitating improvement in the porosity and the bonding performance of the heat-resistant fiber layer. Moreover, the receiving device is optionally a roller, and the rotational speed of the roller is optionally 100 rpm to 6000 rpm, and is optionally 1000 rpm to 2000 rpm. When the linear velocity of a surface of a collection device used to collect fiber is excessively small, because a jet stream in rapid movement is in a disordered state, fiber formed in this case is distributed on the surface of the collection device in an irregular accumulation state, and the mechanical strength of the obtained heat-resistant fiber layer is relatively poor. When the linear velocity of the surface of the collection device reaches a particular level, the formed fiber is tightly attached onto the surface of the collection device in a circular manner, and the fiber is deposited in a same direction, and is basically in a straight state, that is, fiber bundles that are straight and extend in a same direction are generated. On the other hand, when the linear velocity of the surface of the collection device is excessively large, because an excessively rapid receiving speed damages the jet stream of the fiber, continuous fiber cannot be obtained. Through continuous experiments on a regular electrostatic spinning process, the inventor finds that, only when the rotational speed of the collection device is 100 rpm to 6000 rpm, fiber bundles that are straight and extend in a same direction may be obtained. In an implementation, when the rotational speed of the collection device is 1000 rpm to 2000 rpm, in the obtained heat-resistant fiber layer, the morphology of the fiber is better, to be more favorable to improvement in the mechanical strength of the heat-resistant fiber layer.

When the electrostatic spinning method is the needleless spinning method, spinning conditions optionally include: the temperature is 25° C. to 70° C., the humidity is 2% to 60%, the movement speed of a liquid pool is 0 mm/sec to 2000 mm/sec, the movement speed of a base material is 0 mm/min to 20000 mm/min (in this case, the collection device is plate-shaped, and does not rotate) or the rotational speed of a roller is 100 rpm to 6000 rpm (in this case, the collection device is the roller), the voltage of a positive electrode (the voltage of a source end for generating fiber) is 0 kV to 150 kV, the voltage of a negative electrode (the voltage of the collection device) is −50 kV to 0 kV, and a voltage difference (a difference between the voltage of the source end and that of the collection device) is 10 kV to 100 kV; and optionally include: the temperature is 30° C. to 50° C., the humidity is 2% to 50%, the movement speed of a liquid pool is 100 mm/sec to 400 mm/sec, the movement speed of a base material is 1000 mm/min to 15000 mm/min or the rotational speed of a roller is 1000 rpm to 2000 rpm, the voltage of a positive electrode is 10 kV to 40 kV, the voltage of a negative electrode is −30 kV to 0 kV, and a voltage difference is 20 kV to 60 kV.

The inventor of the disclosure finds through a large quantity of experiments that, on the premise that the concentration of the spinning polymer in the spinning solution falls within the foregoing optional range, by using the electrostatic spinning process under the foregoing conditions, the volatilization speed of the solvent may well match the fiber forming speed, a heat-resistant fiber layer whose appearance is good and adhesivity is higher and in which the adhesivity between filaments in the heat-resistant fiber layer is better may be obtained, and the porosity of the heat-resistant fiber layer may be above 70%, and is optionally 70% to 95%, for example, 75% to 95%.

In the disclosure, the diameter of the fiber in and the thickness of the heat-resistant fiber layer are not particularly limited, and may be specifically altered by controlling a specific process condition. Optionally, the average diameter of the fiber is 100 nm to 2000 nm, and the single-sided thickness of the heat-resistant fiber layer is 0.5 μm to 30 μm; the surface density of the heat-resistant fiber layer is 0.2 $g/m^2$ to 15 $g/m^2$, and is optionally 3 $g/m^2$ to 6 $g/m^2$; and the porosity of the heat-resistant fiber layer is 75% to 95%.

According to the method for preparing a polymer composite membrane provided in the disclosure, the heat-resistant fiber layer formed through the foregoing electrostatic spinning may be compounded onto one side surface of the porous base membrane, or and compounded onto two side surfaces of the porous base membrane. In an implementation, In step S3, the heat-resistant fiber layer is formed on each of two side surfaces of the porous base membrane through electrostatic spinning, thermal rolling and drying are selectively performed, then the heat-resistant fiber layer is formed on another side of the porous base membrane through composition, and thermal rolling and drying are selectively performed.

According to the disclosure, after step S3 in which the heat-resistant fiber layer is formed on the porous base membrane through electrostatic spinning, or the heat-resistant fiber layer is compounded onto the porous base membrane, the method further includes: selectively performing membrane lamination processing at 50° C. to 120° C. and under 0.5 Mpa to 15 Mpa, for example, performing thermal rolling (thermal rolling conditions are: the temperature is 50° C. to 60° C., and the pressure is 1 MPa to 15 MPa), and then performing air blowing and drying for 24 h at 50° C.

According to the preparation method of the disclosure, in step S1, the porous base membrane is a ceramic membrane, and the ceramic membrane includes a polymer base membrane and a ceramic layer that is located on at least one side surface of the polymer base membrane; and in step S2, the heat-resistant fiber layer is formed on a surface of the ceramic layer of the ceramic membrane. According to the disclosure, the ceramic membrane is used, and a characteristic in which the ceramic layer of the ceramic membrane contains an inorganic particle layer is used, so that the heat-resistant fiber layer may be more firmly bonded onto a surface of the ceramic layer. On one hand, the peeling strength of the prepared polymer composite membrane may be effectively improved, and on the other hand, the inorganic particle layer is located between the membrane and the heat-resistant fiber layer, and the entire polymer composite membrane may be endowed with excellent thermal shrinkage resistance performance.

According to the preparation method of the disclosure, a method for preparing the ceramic membrane in step S1 includes: S11: providing a polymer base membrane; and S12: mixing and stirring ceramic particles, a binder, a dispersant, and a thickener according to a weight ratio of 100:(2 to 8):(0.3 to 1):(0.5 to 1.8) to obtain a ceramic layer slurry, applying the ceramic layer slurry onto at least one side surface of the polymer base membrane, and performing drying to obtain the ceramic layer (optionally, the ceramic layer is formed on each of two side surfaces of the polymer base membrane), where the number-average molecular weight of the dispersant is below 50000.

According to the preparation method of the disclosure, the dispersity of raw materials in the ceramic layer slurry and the stability of the ceramic layer slurry are comprehensively considered, and optionally in step S12, the ceramic particles, the binder, the dispersant, and the thickener are at 3000 rpm to 10000 rpm, optionally at 3000 rpm to 9000 rpm, and particularly optionally at 3000 rpm to 8000 rpm. When substances for forming the ceramic layer slurry are mixed at the foregoing optional rotational speed, it is more favorable to improvement in the surface density of the ceramic membrane.

According to the preparation method of the disclosure, optionally, the ceramic particles, the binder, the dispersant, and the thickener are mixed according to the foregoing weight ratio, and when the use amount of the dispersant is less than 0.3 part by weight and/or the use amount of the thickener is less than 0.5 part by weight, the dispersity of the ceramic slurry may be insufficient, and it is difficult to form highly dense accumulation so as to obtain the surface density of $1.8 \text{ mg/cm}^2 < \rho \leq 2.7 \text{ mg/cm}^2$ of the disclosure; and when the use amount of the dispersant is greater than 1 part by weight and/or the use amount of the thickener is greater than 1.8 parts by weight, the air permeability of the membrane may be affected and consequently the output characteristic of the battery is affected. When the use amount of the binder is less than 2 parts by weight, the bonding strength may be insufficient; and when the use amount of the binder is greater than 8 parts by weight, the air permeability of the ceramic membrane may be affected. When the number-average molecular weight of the dispersant is higher than 50000, the dispersion effect of the ceramic slurry may be affected, and the surface density may be reduced. When the foregoing stirring rotational speed is less than 3000 rpm, the slurry is dispersed insufficiently, and highly dense accumulation may be formed to obtain the surface density of $1.8 \text{ mg/cm}^2 < \rho \leq 2.7 \text{ mg/cm}^2$; and when the foregoing stirring rotational speed is greater than 10000 rpm, the stability of the ceramic layer slurry may be damaged.

According to the preparation method of the disclosure, the thickness of the polymer base membrane may be usually 5 μm to 30 μm, and is optionally 6 μm to 25 μm. The material of the polymer base membrane is described above, and details are not described herein. Moreover, the use amount of the ceramic layer slurry may be selected to enable the single-sided thickness of the obtained ceramic layer to be 1 μm to 5 μm, and optionally 2 μm to 3.5 μm, so as to be more favorable to improvement in the high-temperature resistance and thermal-shrinkage resistance performance of the ceramic membrane and improvement in the air permeability. Types and properties of the ceramic particles, the binder, the dispersant, and the thickener in the ceramic layer slurry and the material of the polymer base membrane are described above, and details are not described herein.

Optionally, in step S12, the ceramic particles, the binder, the dispersant, and the thickener are stirred and mixed according to a weight ratio of 100:(4 to 6):(0.4 to 0.8):(0.7 to 1.5). When the use amount of each substance in the ceramic layer slurry is controlled to be within the foregoing optional range, the obtained ceramic membrane is enabled to have higher surface density and better high-temperature resistance and thermal-shrinkage resistance performance.

Moreover, in the method for preparing a polymer composite membrane according to the disclosure, in an implementation, the ceramic layer slurry obtained through mixing in step S12 may further contain a surface treating agent, and the surface treating agent is 3-glycidyloxypropyltrimethoxysilane and/or 3-glycidyloxypropyltriethoxysilane. In this way, interaction between the ceramic particles and the binder can be further improved, to enhance the strength of the ceramic membrane. Moreover, relative to the ceramic particles of 100 parts by weight, a use amount of the surface treating agent is optionally below 1.5 parts by weight, and is optionally 0.5 to 1.2 parts by weight. In this way, it is more favorable to improvement in the air permeability of the ceramic membrane.

Moreover, the ceramic layer slurry may further contain surfactants such as sodium dodecylbenzenesulfonate, and use amounts of these surfactants may be regularly selected in the field. This can be known by each person skilled in the art, and details are not described herein.

According to the preparation method of the disclosure, in an implementation, step S12 includes: stirring the ceramic particles, the dispersant, and the thickener at a rotational speed of 3000 rpm to 10000 rpm for 0.5 to 3 hours, then adding the surface treating agent and continuing to stir for 0.5 to 3 hours, then adding the binder and stirring for 0.5 to 2 hours at a rotational speed of 3000 rpm to 4000 rpm, then applying the obtained slurry onto at least one side surface of the polymer base membrane, and then performing drying to form the ceramic layer on the at least one side surface of the polymer base membrane, where the ceramic particles, the binder, the dispersant, and the thickener are fed according to a weight ratio of 100:(2 to 8):(0.3 to 1):(0.5 to 1.8), and the number-average molecular weight of the dispersant is below 50000. The temperature of the drying is 50° C. to 80° C. Optionally, in step S12, the ceramic layer is formed on each of two surfaces of the polymer base membrane.

The preparation method according to the disclosure further includes step S3: forming a bonding layer on at least one side surface of the composite membrane obtained in step S2 (the bonding layer is formed on an outermost layer of at least one side of the polymer composite membrane). For a method for forming the bonding layer, refer to a regular technical means in the field. Details are not described herein again.

In the disclosure, optionally, step S3 includes: attaching a bonding layer slurry containing a self-crosslinking pure acrylic emulsion and a self-crosslinking styrene acrylic emulsion and/or a copolymer emulsion of vinylidene fluoride and hexafluoropropylene onto an outermost side of at least one side surface of the composite membrane obtained in step S2, and then performing drying, to form the bonding layer whose porosity is 40% to 65%. In this case, the ceramic membrane not only has good high-temperature resistance and thermal-shrinkage resistance performance, but also has higher ion conductivity and bonding strength, to have a better industrial application prospect.

The self-crosslinking pure acrylic emulsion is an emulsion obtained by performing emulsion polymerization on reaction-type acrylate monomers. The crosslinking degree of the acrylate crosslinked polymer in the self-crosslinking pure acrylic emulsion may be 2% to 30%, and is optionally 5% to 20%. Moreover, the glass transition temperature of the acrylate crosslinked polymer in the self-crosslinking pure acrylic emulsion is optionally −20° C. to 60° C., and is optionally −12° C. to 54° C. According to an implementation of the disclosure, the self-crosslinking pure acrylic emulsion is a first self-crosslinking pure acrylic emulsion and a second self-crosslinking pure acrylic emulsion and/or a third self-crosslinking pure acrylic emulsion mixture, or is a second self-crosslinking pure acrylic emulsion, or is a third self-crosslinking pure acrylic emulsion; an acrylate crosslinked polymer in the first self-crosslinking pure acrylic emulsion contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, an acrylate crosslinked polymer in the second self-crosslinking pure acrylic emulsion contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and an acrylate crosslinked polymer in the third self-crosslinking pure acrylic emulsion contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; and the glass transition temperature of the acrylate crosslinked polymer in the first self-crosslinking pure acrylic emulsion is 50° C. to 60° C., the glass transition temperature of the acrylate crosslinked polymer in the second self-crosslinking pure acrylic emulsion is −20° C. to −5° C., and the glass transition temperature of the acrylate crosslinked polymer in the third self-crosslinking pure acrylic emulsion is 30° C. to 50° C.

The self-crosslinking styrene acrylic emulsion is a copolymer emulsion obtained by copolymerizing a styrene monomer and a reaction-type acrylate monomer. A weight ratio of a styrene structure unit to an acrylate structure unit in the styrene-acrylate crosslinked copolymer may be (0.5 to 2):1, and is optionally (0.67 to 1.5):1. The crosslinking degree of the styrene-acrylate crosslinked copolymer in the self-crosslinking styrene acrylic emulsion may be 2% to 30%, and is optionally 5% to 20%. Moreover, the glass transition temperature of the styrene-acrylate crosslinked copolymer in the self-crosslinking styrene acrylic emulsion is optionally −30° C. to 50° C., and is optionally −20° C. to 50° C. In an implementation, the styrene-acrylate crosslinked copolymer in the self-crosslinking styrene acrylic emulsion contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; and the glass transition temperature of the styrene-acrylate crosslinked copolymer is 15° C. to 30° C.

The glass transition temperature of the vinylidene fluoride-hexafluoropropylene copolymer in the copolymer emulsion of vinylidene fluoride and hexafluoropropylene is optionally −65° C. to −40° C., and is optionally −60° C. to −40° C. According to an implementation of the disclosure, the vinylidene fluoride-hexafluoropropylene copolymer in the copolymer emulsion of vinylidene fluoride and hexafluoropropylene contains a polyvinylidene fluoride chain segment of 80 to 98 wt % and a polyhexafluoropropylene chain segment of 2 to 20 wt %, and optionally contains a polyvinylidene fluoride chain segment of 90 to 96 wt % and a polyhexafluoropropylene chain segment of 4 to 10 wt %; and the glass transition temperature of the vinylidene fluoride-hexafluoropropylene copolymer is optionally −60° C. to −40° C.

The copolymer emulsion of vinylidene fluoride and hexafluoropropylene may be commercially available, or may be prepared by using various existing methods, or may be obtained by making vinylidene fluoride-hexafluoropropylene copolymer powder into an emulsion. According to a specific implementation of the disclosure, the copolymer emulsion of vinylidene fluoride and hexafluoropropylene is prepared by using the following method:

(1) dissolving a dispersant in water, and selectively adjusting a pH value thereof, to obtain an aqueous solution A of the dispersant; and (2) slowly adding vinylidene fluoride-hexafluoropropylene copolymer powder into the aqueous solution A of the dispersant while stirring; and after the vinylidene fluoride-hexafluoropropylene copolymer powder is added completely, first stirring at a low speed, then stirring at a high speed, and finally performing homogeneous dispersion at a high pressure, to form the copolymer emulsion of vinylidene fluoride and hexafluoropropylene.

The dispersant is a water-soluble polymer dispersant, including two types: an ionic dispersant (polyelectrolyte) and a non-ionic dispersant. The ionic dispersant is a polycarboxylic acid dispersant that is obtained by homopolymerizing vinyl monomers containing carboxyl (for example, acrylic acid or maleic anhydride) or copolymerizing a vinyl monomer containing carboxyl and another monomer, and then performing alkali neutralization and alcohol esterification. Examples of the ionic dispersant include but are not limited to: polyacrylic acid (PAA), polyethylenimine (PEI), cetyltrimethylammonium bromide (CTAB), polyamide, polyacrylamide (PAM), an acrylic acid-acrylate copolymer, poly(acrylic acid-co-acrylamide) [P(AA/AM)], an ammonium acrylate-acrylate copolymer, poly(styrene-co-maleic anhydride) (SMA), a styrene-acrylic acid copolymer, an acrylic acid-maleic anhydride copolymer, a maleic anhydride-acrylamide copolymer, and the like. The non-ionic dispersant includes polyethylene glycol (PEG), polyvinyl alcohol (PVA), polyvinylpyrrolidone (PVP), fatty alcohol polyoxyethylene ether (JFC), and the like. The weight-average molecular weight of the dispersant is 100 g/mol to 500000 g/mol, and is optionally 1000 g/mol to 100000 g/mol. The concentration of the aqueous solution A of the dispersant is 0.01 wt % to 10 wt %, is optionally 0.05 wt % to 5 wt %, and is optionally 0.1 wt % to 2 wt %. The use amount of the dispersant is 0.05 wt % to 10 wt % of the use amount of the used vinylidene fluoride-hexafluoropropylene copolymer powder, optionally 0.1 wt % to 6 wt %, and optionally 0.1 wt % to 2 wt %. When the used ionic dispersant is an anionic polymer (for example, PAM), the solution is adjusted to pH=8 to 9, and the anionic polymer may be completely dissociated, thereby effectively protecting the vinylidene fluoride-hexafluoropropylene copolymer powder, and stably dispersing the vinylidene fluoride-hexafluoropropylene copolymer powder in an aqueous phase. When the used ionic dispersant is a cationic polymer (for example, PEI or CTAB), the solution is adjusted to pH=4 to 5, and the cationic polymer may be dissociated quite well, thereby effectively protecting the vinylidene fluoride-hexafluoropropylene copolymer powder, and stably dispersing the vinylidene fluoride-hexafluoropropylene copolymer powder in an aqueous phase. When the used dispersant is a non-ionic polymer dispersant, the pH value of the solution is not adjusted.

According to an implementation of the disclosure, the bonding layer slurry contains the self-crosslinking pure acrylic emulsion and the self-crosslinking styrene acrylic emulsion and does not contain the copolymer emulsion of vinylidene fluoride and hexafluoropropylene, and a weight ratio of a solid content of the self-crosslinking pure acrylic emulsion to that of the self-crosslinking styrene acrylic emulsion is from 1:0.05 to 1:2, and is optionally from 1:1 to 1:2; or the bonding layer slurry contains the self-crosslinking pure acrylic emulsion and the copolymer emulsion of vinylidene fluoride and hexafluoropropylene and does not contain the self-crosslinking styrene acrylic emulsion, and a weight ratio of a solid content of the self-crosslinking pure acrylic emulsion to that of the copolymer emulsion of vinylidene fluoride and hexafluoropropylene is from 1:0.3 to 1:25, and is optionally from 1:0.4 to 1:19; or the bonding layer slurry contains the self-crosslinking pure acrylic emulsion, the self-crosslinking styrene acrylic emulsion, and the copolymer emulsion of vinylidene fluoride and hexafluoropropylene, and a weight ratio between a solid content of the self-crosslinking pure acrylic emulsion a solid content of the self-crosslinking styrene acrylic emulsion and a solid content of the copolymer emulsion of vinylidene fluoride and hexafluoropropylene is 1:(0.01 to 2):(0.3 to 5), and is optionally 1:(0.05 to 1.5):(0.45 to 3). The inventor of the disclosure finds through in-depth research that, when the foregoing several polymer emulsions are cooperatively used according to the foregoing particular proportion, it is quite favorable to improvement in the liquid absorption rate and the conductivity of the ceramic membrane and improvement in the manufacturing performance.

According to a particular optional implementation of the disclosure, the bonding layer slurry contains a first self-crosslinking pure acrylic emulsion, a second self-crosslinking pure acrylic emulsion, and the self-crosslinking styrene acrylic emulsion and does not contain the copolymer emulsion of vinylidene fluoride and hexafluoropropylene, and a weight ratio between a solid content of the first self-crosslinking pure acrylic emulsion, a solid content of the second self-crosslinking pure acrylic emulsion and a solid content of the self-crosslinking styrene acrylic emulsion is (5 to 10):1:(10 to 13); or the bonding layer slurry contains the first self-crosslinking pure acrylic emulsion, the second self-crosslinking pure acrylic emulsion, and the copolymer emulsion of vinylidene fluoride and hexafluoropropylene and does not contain the self-crosslinking styrene acrylic emulsion, and a weight ratio between a solid content of the first self-crosslinking pure acrylic emulsion, a solid content of the second self-crosslinking pure acrylic emulsion and a solid content of the copolymer emulsion of vinylidene fluoride and hexafluoropropylene is (5 to 15):1:(5 to 12); or the bonding layer slurry contains the second self-crosslinking pure acrylic emulsion and the copolymer emulsion of vinylidene fluoride and hexafluoropropylene and does not contain the self-crosslinking styrene acrylic emulsion, and a weight ratio of a solid content of the second self-crosslinking pure acrylic emulsion to that of the copolymer emulsion of vinylidene fluoride and hexafluoropropylene is 1:(5 to 20); or the bonding layer slurry contains the second self-crosslinking pure acrylic emulsion, the self-crosslinking styrene acrylic emulsion, and the copolymer emulsion of vinylidene fluoride and hexafluoropropylene, and a weight ratio between a solid content of the second self-crosslinking pure acrylic emulsion, a solid content of the self-crosslinking styrene acrylic emulsion and a solid content of the copolymer emulsion of vinylidene fluoride and hexafluoropropylene is 1:(0.5 to 2):(1 to 5); or the bonding layer slurry contains the third self-crosslinking pure acrylic emulsion, the self-crosslinking styrene acrylic emulsion, and the copolymer emulsion of vinylidene fluoride and hexafluoropropylene, and a weight ratio between a solid content of the third self-crosslinking pure acrylic emulsion, a solid content of the self-crosslinking styrene acrylic emulsion and a solid content of the copolymer emulsion of vinylidene fluoride and hexafluoropropylene is 1:(0.5 to 2):(1 to 5); or the bonding layer slurry contains the first self-crosslinking pure acrylic emulsion, the second self-crosslinking pure acrylic emulsion, the self-crosslinking styrene acrylic emulsion, and the copolymer emulsion of vinylidene fluoride and hexafluoropropylene, and a weight ratio between a solid content of the first self-crosslinking pure acrylic emulsion, a solid content of the second self-crosslinking pure acrylic emulsion a solid content of the self-crosslinking styrene acrylic emulsion and a solid content of the copolymer emulsion of vinylidene fluoride and hexafluoropropylene is (10 to 15):1:(0.5 to 2):(5 to 10); and an acrylate crosslinked polymer in the first self-crosslinking pure acrylic emulsion contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, an acrylate crosslinked polymer in the second self-crosslinking pure acrylic emulsion contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and an acrylate crosslinked polymer in the third self-crosslinking pure acrylic emulsion contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer in the self-crosslinking styrene acrylic emulsion contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer in the copolymer emulsion of vinylidene fluoride and hexafluoropropylene contains a polyvinylidene fluoride chain segment of 80 to 98 wt % and a polyhexafluoropropylene chain segment of 2 to 20 wt %; and the glass transition temperature of the acrylate crosslinked polymer in the first self-crosslinking pure acrylic emulsion is 50° C. to 60° C., the glass transition temperature of the acrylate crosslinked polymer in the second self-crosslinking pure acrylic emulsion is −20° C. to −5° C., the glass transition temperature of the acrylate crosslinked polymer in the third self-crosslinking pure acrylic emulsion is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

According to the disclosure, optionally, the bonding layer slurry further contains at least one of a copolymer emulsion of acrylonitrile and acrylate, a vinyl chloride-propylene emulsion, and a butadiene-styrene latex. When the bonding layer slurry further contains a copolymer emulsion of acrylonitrile and acrylate, it is favorable to improvement in the ion conductivity of the polymer composite membrane inside the battery; and when the bonding layer slurry further contains a vinyl chloride-propylene emulsion and/or a butadiene-styrene latex, it is favorable to reduction in the liquid absorption rate of the polymer composite membrane, so that the liquid absorption rate cannot go so far as to be excessively high. If the liquid absorption rate is excessively high, the positive electrode and the negative electrode inside the battery are lack of an electrolyte and consequently the performance of the battery is deteriorated.

When the bonding layer slurry further contains the copolymer emulsion of acrylonitrile and acrylate, a weight ratio of a solid content of the copolymer emulsion of acrylonitrile and acrylate to that of the self-crosslinking pure acrylic emulsion is optionally (0.05 to 2):1, and is optionally (0.08 to 1.85):1. When the bonding layer slurry further contains the vinyl chloride-propylene emulsion, a weight ratio of a solid content of the vinyl chloride-propylene emulsion to that of the self-crosslinking pure acrylic emulsion is optionally (0.15 to 7):1, and is optionally (0.2 to 6):1. When the bonding layer slurry further contains the butadiene-styrene latex, a weight ratio of a solid content of the butadiene-styrene latex to that of the self-crosslinking pure acrylic emulsion is optionally (0.05 to 2):1, and is optionally (0.08 to 1.85):1.

Moreover, to be more favorable to attachment of the bonding layer slurry, optionally, the total solid content of the bonding layer slurry is 0.5 wt % to 25 wt %, and is optionally 1 wt % to 20 wt %, for example, 1 wt % to 10 wt %.

A spraying method and/or a screen-printing method is optionally used as the attaching method, and discontinuous coverage is formed by using the spraying method and/or the screen-printing method, thereby directly forming a porous membrane having the foregoing porosity. In this way, a porous (discontinuous) self-crosslinking polymer coating can be prepared, and a separation process is not required.

In the disclosure, conditions of the spraying and the screen-printing are not particularly limited. For example, the temperature of the spraying is optionally 30° C. to 80° C., and is optionally 40° C. to 75° C. The temperature of the screen-printing is optionally 30° C. to 80° C., and is optionally 40° C. to 75° C.

The use amount of the bonding layer slurry may be selected to enable the single-sided thickness of the formed bonding layer to be 0.1 μm to 1 μm, and optionally 0.2 μm to 0.6 μm.

In the disclosure, the temperature for drying the bonding layer slurry is not particularly limited, is optionally 30° C. to 80° C., and is optionally 40° C. to 75° C.

The disclosure further provides a ceramic membrane prepared by using the foregoing method.

Moreover, the disclosure further provides a lithium-ion battery, and the lithium-ion battery includes a positive electrode plate, a negative electrode plate, an electrolyte, and a battery membrane, where the battery membrane is the foregoing polymer composite membrane of the disclosure.

The electrolyte is well known by a person skilled in the art, and is usually formed by an electrolyte lithium salt and an organic solvent. A dissociable lithium salt is used as the electrolyte lithium salt. For example, the electrolyte lithium salt may be selected from at least one of lithium hexafluorophosphate ($LiPF_6$), lithium perchlorate ($LiClO_4$), lithium tetrafluoroborate ($LiBF_4$), and the like, and the organic solvent may be selected from at least one of ethylene carbonate (EC), propylene carbonate (PC), dimethyl carbonate (DMC), ethyl methyl carbonate (EMC), diethyl carbonate (DEC), vinylene carbonate (VC), and the like. Optionally, the concentration of the electrolyte lithium salt in the electrolyte is 0.8 mol/L to 1.5 mol/L.

The positive electrode plate is made by mixing a positive electrode material used for the lithium-ion battery, a conductive agent, and a binder into a slurry and applying the slurry onto an aluminum foil. The used positive electrode material includes any positive electrode material that may be used for the lithium-ion battery, for example, at least one of lithium cobalt oxide ($LiCoO_2$), lithium nickel oxide ($LiNiO_2$), lithium manganese oxide ($LiMn_2O_4$), lithium iron phosphate ($LiFePO_4$), and the like.

The negative electrode plate is made by mixing a negative electrode material used for the lithium-ion battery, a conductive agent, and a binder into a slurry and applying the slurry onto a copper foil. The used negative electrode material includes any negative electrode material that may be used for the lithium-ion battery, for example, at least one of graphite, soft carbon, hard carbon, and the like.

A main improvement of the lithium-ion battery provided in the disclosure is in that a novel polymer composite membrane is used as the battery membrane, and an arrangement manner (connection manner) of the positive electrode plate, the negative electrode plate, the polymer composite membrane, and the electrolyte may be the same as that in the prior art. This can be known by each person skilled in the art, and details are not described herein.

The lithium-ion battery provided in the disclosure has advantages of good cycle performance, long service life, good rate charge/discharge performance, and good high-temperature performance.

A method for preparing a lithium-ion battery provided in the disclosure includes: stacking or winding a positive electrode plate, a battery membrane, and a negative electrode plate sequentially into an electrode core, then injecting an electrolyte into the electrode core, and performing sealing, where the battery membrane is the foregoing polymer composite membrane. The materials or formations of the positive electrode plate, the negative electrode plate, and the electrolyte are described above, and details are not described herein.

The disclosure is described in detail below by using specific embodiments.

In the following embodiments and comparison examples, physicochemical parameters of raw materials are as follows:

(1) Components of a self-crosslinking pure acrylic emulsion:

1.1. 1040: a polybutyl acrylate chain segment accounts for 15 wt %, a polymethyl methacrylate chain segment accounts for 75 wt %, a polyethylene acrylate chain segment accounts for 5 wt %, a polyacrylic acid chain segment accounts for 5 wt %, the glass transition temperature Tg=54° C., and the solid content is 50 wt %, Shanghai Aigao Chemical Co., Ltd.;

1.2. 1005: a polybutyl acrylate chain segment accounts for 55 wt %, a polymethyl methacrylate chain segment accounts for 35 wt %, a polyethylene acrylate chain segment accounts for 5 wt %, a polyacrylic acid chain segment accounts for 5 wt %, the glass transition temperature Tg=−12° C., and the solid content is 50 wt %, Shanghai Aigao Chemical Co., Ltd.; and 1.3. 1020: a polybutyl acrylate chain segment accounts for 25 wt %, a polymethyl methacrylate chain segment accounts for 65 wt %, a polyethylene acrylate chain segment accounts for 5 wt %, a polyacrylic acid chain segment accounts for 5 wt %, the glass transition temperature Tg=40° C., and the solid content is 50 wt %, Shanghai Aigao Chemical Co., Ltd.

(2) Components of a self-crosslinking styrene acrylic emulsion:

5601: a polyphenyl ethylene chain segment accounts for 45 wt %, a polybutyl acrylate chain segment accounts for 35 wt %, a polymethyl methacrylate chain segment accounts for 10 wt %, a polyethylene acrylate chain segment accounts for 5 wt %, a polyacrylic acid chain segment accounts for 5 wt %, the glass transition temperature Tg=22° C., and the solid content is 50 wt %, Shanghai Aigao Chemical Co., Ltd.

(3) Copolymer emulsion of vinylidene fluoride and hexafluoropropylene:

10278: a polyvinylidene fluoride chain segment accounts for 95 wt %, a polyhexafluoropropylene chain segment accounts for 5 wt %, the weight-average molecular weight Mw=450000, the glass transition temperature is −55° C., and the solid content is 30 wt %, Arkema.

A method for testing performance parameters related to the following embodiments and comparison examples is as follows:

(1) Test of the surface density of a ceramic layer is: taking a membrane paper of 10 cm²×10 cm² (a ceramic membrane before a heat-resistant fiber layer is formed) and a PE base membrane, weighing respective weights of m1 (mg) and m2 (mg) thereof, measuring respective membrane thicknesses of d1 (μm) and d2 (μm) thereof, where the surface density of the ceramic layer at a unit thickness=(m1−m2)×$\rho_{Al2O3}$/[10×10×(d1−d2)×10$^{-4}$×ρ], where $\rho_{Al2O3}$ is the true density of aluminum oxide, and ρ is the true density of used ceramic particles.

(2) Test of the air permeability (Gurley value) of the ceramic layer is: cutting the ceramic membrane into a ceramic membrane sample having an area of 6.45 cm², and measuring, by using a Gurley value tester GURLEY-4110 and at a pressure (height of water column) of 12.39 cm, the time (s/100 ml) required by gas (air) of 100 ml to permeate the foregoing ceramic membrane sample, where a smaller value thereof indicates better air permeability.

(3) Test of the peeling strength of the ceramic layer is: preparing, respectively according to respective processes of the following embodiments and comparison examples, a ceramic membrane including only a single-sided ceramic layer and not including a heat-resistant fiber layer and a bonding layer, tailoring a sample of 40 mm×100 mm from the ceramic membrane, respectively fixing two surfaces of the ceramic membrane onto a stationary fixture and a movable fixture by using an adhesive tape, and reversely stretching at 180° C. to peel the ceramic layer from a base material membrane, where if a larger pulling force is required, the peeling strength of the ceramic membrane is higher, to indicate that the bonding strength is higher.

(4) Test of the thermal stability of the ceramic membrane is: tailoring a ceramic membrane test sample of 5 cm×5 cm from the ceramic membrane, respectively placing the ceramic membrane test sample in an oven at 120° C. and 160° C., baking the ceramic membrane test sample for 1 hours, and comparing areas before and after the baking to determine a change, and taking a ratio of an area change value to an original area (shrinkage percentage) to measure the thermal stability of the ceramic membrane, where if the ratio does not exceed 5%, the thermal stability is A, and if the ratio is greater than 5%, the thermal stability is B.

(5) Method for measuring the glass transition temperature of the material of the heat-resistant fiber layer is: measuring the glass transition temperature by using a differential scanning calorimeter produced by Mettler-Toledo Corporation.

(6) Method for measuring the liquid absorption rate of the material of the heat-resistant fiber layer is: dissolving a to-be-measured material in a corresponding solvent, performing pouring to form a sample having a designated size (for example, a wafer whose diameter is 17 mm), performing drying, then weighing the sample of a mass m1 in a glove box (at 25° C.) full of argon, then immersing the sample in an electrolyte (the electrolyte contains a lithium salt LiPF$_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference) for 24 h, then taking out the sample, drying the liquid on the surface of the sample by using filter paper (not performing pressing processing), weighing the sample of a mass m2, and then calculating a corresponding liquid absorption rate according to a calculation formula: "liquid absorption rate= (m2−m1)/m1×100%".

(7) Test of the porosity of the heat-resistant fiber layer is: tailoring a heat-resistant fiber layer sample of a particular volume, weighing, then immersing the heat-resistant fiber layer sample in n-butyl alcohol, and measuring the weight of the sample after adsorption and balancing, where the $$\text{porosity} = \frac{\text{Mass after adsorption} - \text{Mass before adsorption}}{\rho_{isobutanol}\text{Sample volume}} \times 100\%.$$

(8) Test of the porosity of the bonding layer is: tailoring each of porous self-crosslinking polymer membranes Sb1 to Sb14 obtained in Embodiments 17 to 31 into a wafer whose diameter is 17 mm, weighing, then immersing a bonding layer sample in n-butyl alcohol for 2 h, then taking out the sample, drying liquid on the surface of the membrane by using filter paper, weighing the mass in this case, and calculating the porosity according to the following formula:

$$P(\%) = \frac{M - M_0}{\rho_{BuOH}\pi r^2 d} \times 100\%$$

where P is the porosity, $M_0$ is the mass (mg) of a dry membrane, M is the mass (mg) after immersion in the n-butyl alcohol for 2 h, r is the radius (mm) of the membrane, and d is the thickness (μm) of the membrane.

(9) Surface density of the bonding layer is: respectively taking a PE base membrane of 0.2 m×0.2 m and a PE base membrane containing the bonding layer, and weighing respective weights of $M_0$(g) and M(g) thereof, where the surface density=[(M−$M_0$)/0.04] g/m².

(10) Test of the liquid absorption rate of the bonding layer is: tailoring each of porous self-crosslinking polymer membranes Sb1 to Sb14 obtained in Embodiments 17 to 31 into a wafer whose diameter is 17 mm, and then performing testing with reference to the foregoing method for measuring the liquid absorption rate of the material of the heat-resistant fiber layer.

(11) Test of the ion conductivity of the bonding layer is: tailoring, by using an alternating-current impedance test, each of porous self-crosslinking polymer membranes Sb1 to Sb14 obtained in Embodiments 17 to 31 into a wafer whose diameter is 17 mm, drying the wafer, then placing the wafer between two stainless steel (SS) electrodes, absorbing a sufficient amount of electrolyte (the electrolyte contains a lithium salt LiPF$_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference), sealing the electrolyte in a 2016-type button cell, and then performing an alternating-current impedance experiment, where an intersection point between a linear part and a real axis is the bulk resistance of the electrolyte, and therefore the ion conductivity of the bonding layer may be obtained as follows: σ=L/A·R (where L indicates the thickness (cm) of the bonding layer, A is the contact area (cm$^2$) between a stainless steel plate and a membrane, and R is the bulk resistance (mS) of the electrolyte).

(12) Test of the mechanical strength is: testing, by using a universal testing machine (calibrated) of Shenzhen Junrui, the stretching and puncturing performance of a polymer composite membrane prepared in each of the foregoing embodiments.

(13) Test of the thermal shrinkage percentage is: tailoring a square sheet of 6 cm×6 cm from the polymer composite membrane prepared in the foregoing embodiment, placing the square sheet into an oven, respectively baking the square sheet for 1 h at 120° C., 140° C., 160° C., and 180° C., and measuring the length and the width of the square sheet. A formula of calculating the thermal shrinkage percentage is: thermal shrinkage percentage=(1−the length of the sample after thermal shrinkage/6)×100%.

(14) Test of the ion conductivity is: tailoring, by using an alternating-current impedance test, the polymer composite membrane prepared in each of the embodiments and the comparison examples into a wafer whose diameter is 17 mm, and testing the wafer. For the testing method, refer to the foregoing test of the ion conductivity of the bonding layer.

Embodiment 1 (Preparing a Polymer Composite Membrane of a Two-Layered Structure of PE Base Membrane-Heat-Resistant Fiber Layer)

This embodiment is used to describe a polymer composite membrane and a method for preparing same provided in the disclosure.

(1) Form a heat-resistant fiber layer on a PE base membrane:

mixing polyetherimide (which is ultem 1000 commercially available from SABIC Innovative Plastics (Shanghai) Co., Ltd., and whose melting point is 370° C. to 410° C. and glass transition temperature is 215° C., the same below) and polyvinylidene fluoride-hexafluoropropylene (which is commercially available from Arkema Investment Co., Ltd., and whose weight-average molecular weight is 450000 g/mol, melting point is 152° C., glass transition temperature is −40° C., and liquid absorption rate in an electrolyte at 25° C. is 45%, the same below) according to a weight ratio 1:1, stirring the two polymers evenly in a mixing manner through mechanical stirring at a stirring speed of 1200 rpm, mixing the two polymers for 2 h to obtain a mixture, adding the foregoing mixture into N-methyl-2-pyrrolidinone (NMP), magnetically stirring the N-methyl-2-pyrrolidinone in water bath of 70° C. to fully dissolve the mixture, to form a spinning solution whose concentration is 30 wt %.

One side surface of a PE base membrane of 12 μm (which is commercially available from Japan SK Corporation and whose trade mark is BD1201, the same below) wraps a roller (a collection device), and on a surface of the PE base membrane, electrostatic spinning is performed on the foregoing spinning solution by using a needle electrostatic spinning method. Parameters for adjusting electrostatic spinning are as follows: the receiving distance is 12 cm, the temperature is 25° C., the humidity is 20%, the inner diameter of a needle is 0.46 mm, a movement speed of the needle is 6.6 mm/sec, the voltage is 10 kV, the stream velocity is 0.3 mL/h, and the rotational speed of the roller is 2000 rpm.

After electrostatic spinning ends, the foregoing PE base membrane is taken down, mould pressing is performed for 5 min at a pressure of 10 MPa, and then air blowing and drying are performed for 24 h at 50° C., to obtain a polymer composite membrane F1 on which a heat-resistant fiber layer (whose thickness is 3 μm and porosity is 85%) is formed.

(2) Structure and performance representation of the polymer composite membrane:

The FIGURE is an SEM image of the polymer composite membrane F1. As shown in the FIGURE, it may be seen that the heat-resistant fiber layer is formed by many fibers whose thicknesses are relatively close, and the formed heat-resistant fiber layer contains a large quantity of voids, the voids are distributed evenly, and a ceramic layer under the heat-resistant fiber layer can be further obviously seen. Moreover, it may be seen that a network-shaped structure is formed between the fibers.

The diameter of the fiber in the SEM image is measured by using TEM Macrography software, data is recorded, the finally calculated average fiber diameter is 176 nm, and calculation is performed according to the gravimetric method to learn that the surface density of the heat-resistant fiber layer is 1.22 g/m$^2$.

Through testing, the transverse stretching strength and the longitudinal stretching strength of the polymer composite membrane F1 are respectively 145 Mpa and 148 MPa, the needling strength is 0.53 kgf, and the ion conductivity is 8.0 mS/cm. Moreover, the polymer composite membrane F1 is baked for 1 h at 120° C., 140° C., 160° C., and 180° C., transverse thermal shrinkage percentages are respectively: 1%, 3.5%, 8.2%, and 10%, and longitudinal thermal shrinkage percentages are respectively: 0.8%, 3.3%, 11.5%, and 11.8%.

Embodiment 2 (Preparing a Polymer Composite Membrane of a Three-Layered Structure of Heat-Resistant Fiber Layer-PE Base Membrane-Heat-Resistant Fiber Layer)

This embodiment is used to describe a polymer composite membrane and a method for preparing same provided in the disclosure.

(1) Form a heat-resistant fiber layer: a first heat-resistant fiber layer (whose thickness is 1.5 μm and porosity is 85%) is first formed on a side of a PE base membrane by using the method in Embodiment 1, and then a second heat-resistant fiber layer (whose thickness is 1.5 μm and porosity is 85%) is formed on another side of the PE base membrane, to obtain a polymer composite membrane F2.

Through testing, the transverse stretching strength and the longitudinal stretching strength of the polymer composite membrane F2 are respectively 148 Mpa and 150 MPa, the needling strength is 0.53 kgf, and the ion conductivity is 8.0 mS/cm. Moreover, the polymer composite membrane F2 is baked for 1 h at 120° C., 140° C., 160° C., and 180° C., transverse thermal shrinkage percentages are respectively: 0.9%, 3.2%, 8%, and 9.2%, and longitudinal thermal shrinkage percentages are respectively: 0.75%, 3%, 11%, and 11.5%.

Comparison Example 1 (PE Base Membrane)

This comparison example is used to comparatively describe beneficial effects of a polymer composite membrane provided in the disclosure.

(1) APE membrane that is commercially available from Japan SK Corporation and whose trade mark is BD1201 is used as a comparison sample, and is marked as DF1 (whose thickness is 12 μm and porosity is 45%).

(2) Through testing, the transverse stretching strength and the longitudinal stretching strength of the PE membrane are respectively 150 Mpa and 152 MPa, the needling strength is 0.501 kgf, and the ion conductivity is 7.9 mS/cm. Moreover, the PE membrane is baked for 1 h at 120° C., 140° C., 160° C., and 180° C., transverse thermal shrinkage percentages are respectively: 70%, 95%, 95%, and 95%, and longitudinal thermal shrinkage percentages are respectively: 75.2%, 96%, 96%, and 96%.

Comparison Example 2 (Preparing a Polymer Composite Membrane of a Two-Layered Structure of PE Base Membrane-Heat-Resistant Fiber Layer)

This comparison example is used to comparatively describe beneficial effects of a polymer composite membrane provided in the disclosure.

(1) Form a heat-resistant fiber layer on a PE base membrane: with reference to Embodiment 1, a difference is in that, a spinning solution is a spinning solution whose concentration is 30 wt % formed by adding polyetherimide into an NMP solution, and magnetically stirring the solution in water bath at 70° C. to fully dissolve the polyetherimide, and a polymer composite membrane DF2 on which a heat-resistant fiber layer is formed (the thickness of the heat-resistant fiber layer is 3 and the porosity is 82%) is further obtained through electrostatic spinning.

(2) Structure and performance representation of the polymer composite membrane:

The diameter of the fiber in the SEM image is measured by using TEM Macrography software, data is recorded, the finally calculated average fiber diameter is 189 nm, and calculation is performed according to the gravimetric method to learn that the surface density of the heat-resistant fiber layer is 1.22 g/m$^2$. Fiber filaments in the obtained fiber layer are quite easily separated or disengaged from each other, and consequently application is difficult. Through testing, the transverse stretching strength and the longitudinal stretching strength of the polymer composite membrane DF2 are respectively 137 Mpa and 145 MPa, the needling strength is 0.52 kgf, and the ion conductivity is 7.9 mS/cm. Moreover, the polymer composite membrane DF2 is baked for 1 h at 120° C., 140° C., 160° C., and 180° C., transverse thermal shrinkage percentages are respectively: 1%, 3.3%, 7.9%, and 9.8%, and longitudinal thermal shrinkage percentages are respectively: 0.8%, 3.1%, 11.2%, and 11.4%.

Comparison Example 3 (Preparing a Polymer Composite Membrane of a Two-Layered Structure of PE Base Membrane-Heat-Resistant Fiber Layer)

This comparison example is used to comparatively describe beneficial effects of a polymer composite membrane provided in the disclosure.

(1) Form a heat-resistant fiber layer on a PE base membrane: with reference to Embodiment 1, a difference is in that, a spinning solution is a spinning solution whose concentration is 30 wt % formed by adding polyvinylidene fluoride-hexafluoropropylene into an NMP solution, magnetically stirring the solution in water bath at 70° C. to fully dissolve the polyvinylidene fluoride-hexafluoropropylene, and a polymer composite membrane DF3 on which a heat-resistant fiber layer is formed (the thickness of the heat-resistant fiber layer is 3 μm, and the porosity is 83.5%) is further obtained through electrostatic spinning.

(2) Structure and performance representation of the polymer composite membrane:

The diameter of the fiber in the SEM image is measured by using TEM Macrography software, data is recorded, the finally calculated average fiber diameter is 129 nm, and calculation is performed according to the gravimetric method to learn that the surface density of the heat-resistant fiber layer is 1.07 g/m$^2$. Through testing, the transverse stretching strength and the longitudinal stretching strength of the polymer composite membrane DF3 are respectively 129 Mpa and 142 MPa, the needling strength is 0.515 kgf, and the ion conductivity is 8.5 mS/cm. Moreover, the polymer composite membrane DF3 is baked for 1 h at 120° C., 140° C., 160° C., and 180° C., transverse thermal shrinkage percentages are respectively: 10%, 40%, 70%, and 91%, and longitudinal thermal shrinkage percentages are respectively: 10%, 50%, 77%, and 95%.

Comparison Example 4 (Preparing a Polymer Composite Membrane of a Two-Layered Structure of PE Base Membrane-Heat-Resistant Fiber Layer)

This comparison example is used to comparatively describe beneficial effects of a polymer composite membrane provided in the disclosure.

(1) Form a heat-resistant fiber layer on a PE base membrane: with reference to Embodiment 1, a difference is in that, a spinning solution whose concentration is 30 wt % is prepared by mixing polyvinylidene fluoride (which is commercially available from Arkema Co., Ltd. and whose weight-average molecular weight is 1000000 g/mol, melting point is 172° C., and liquid absorption rate in an electrolyte at 25° C. is 25%) in place of polyvinylidene fluoride-hexafluoropropylene and polyetherimide, and a polymer composite membrane DF4 on which a heat-resistant fiber layer is formed (the thickness of the heat-resistant fiber layer is 3 and the porosity is 83%) is further obtained through electrostatic spinning.

(2) Structure and performance representation of the polymer composite membrane:

The diameter of the fiber in the SEM image is measured by using TEM Macrography software, data is recorded, the finally calculated average fiber diameter is 159 nm, and calculation is performed according to the gravimetric method to learn that the surface density of the heat-resistant fiber layer is 1.23 g/m$^2$. Fibers in the obtained fiber layer are relatively fluffy, and the fibers are also relatively easily disengaged from each other. Through testing, the transverse stretching strength and the longitudinal stretching strength of the polymer composite membrane DF4 are respectively 143 Mpa and 145 MPa, the needling strength is 0.53 kgf, and the ion conductivity is 7.8 mS/cm. Moreover, the polymer composite membrane DF4 is baked for 1 h at 120° C., 140° C., 160° C., and 180° C., transverse thermal shrinkage percentages are respectively: 5%, 7%, 11%, and 30%, and longitudinal thermal shrinkage percentages are respectively: 4.8%, 7.2%, 11.3%, and 29.5%.

Embodiment 3 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane:

2 kg of aluminum oxide (whose average particle size is 400 nm), 0.01 kg of sodium polyacrylate (whose number-average molecular weight is 9000 and which is commercially available from Guangzhou Yuanchang Commerce Co., Ltd.), 0.024 kg of sodium carboxymethylcellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of aluminum oxide is 30 wt %, the mixture is stirred for 1.5 hours at 6000 rpm, then 0.02 kg of 3-glycidyloxypropyltrimethoxysilane is added to continue stirring for 1.5 hours, then 0.1 kg of polyacrylate binder (whose crosslinked monomer is N-methylolacrylamide, whose content is 4 wt %, and whose glass transition temperature is −20° C.) is added, stirring is performed for 1.5 hours at 3000 rpm, then 0.08 kg of sodium dodecylbenzenesulfonate is added, and then stirring is performed for 0.5 hour at 3000 rpm, to obtain a ceramic layer slurry.

The foregoing ceramic layer slurry is applied onto one side surface of a PE base membrane (which is commercially available from Japan SKCorporation and whose trade mark is BD1201, the same below) whose thickness is 12 μm, and drying is performed to obtain a ceramic layer whose thickness is 2.5 μm on the one side surface of the base membrane, to obtain a product, namely, a ceramic membrane C1. Through testing, the surface density of the ceramic layer of the ceramic membrane C1 at the thickness of 1 μm is 2.11 mg/cm$^2$, the air permeability is 202 s/100 ml, the peeling strength is 5.4 N, the thermal stability at 120° C. is A, and the thermal stability at 160° C. is A.

(2) Prepare a heat-resistant fiber layer: with reference to Embodiment 1, a difference is in that, the porous membrane PE is replaced with the foregoing prepared ceramic membrane C1, and a heat-resistant fiber layer is prepared on a surface of the ceramic layer of the ceramic membrane C1 by using the method in Embodiment 1, to prepare a polymer composite membrane F3 on which the heat-resistant fiber layer (whose thickness is 3 μm and porosity is 79%) is formed.

(3) Structure and performance representation of the polymer composite membrane:

The diameter of the fiber in the SEM image is measured by using TEM Macrography software, data is recorded, the finally calculated average fiber diameter is 210 nm, and calculation is performed according to the gravimetric method to learn that the surface density of the heat-resistant fiber layer is 1.23 g/m$^2$. Through testing, the transverse stretching strength and the longitudinal stretching strength of the polymer composite membrane F3 are respectively 115 Mpa and 120 MPa, the needling strength is 0.544 kgf, and the ion conductivity is 7.8 mS/cm. Moreover, the polymer composite membrane F3 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

Comparison Example 5 (Preparing a Polymer Composite Membrane of a Two-Layered Structure of PE Base Membrane-Ceramic Layer)

This comparison example is used to comparatively describe beneficial effects of a polymer composite membrane provided in the disclosure.

(1) Method for preparing a ceramic membrane: the same as the method (1) for preparing a ceramic membrane in Embodiment 3, and the obtained ceramic membrane is marked as DF5 (that is, the ceramic membrane C1 obtained in Embodiment 3).

(2) Structure and performance representation of the polymer composite membrane:

Through testing, the transverse stretching strength and the longitudinal stretching strength of the polymer composite membrane DF5 are respectively 132 Mpa and 145 MPa, the needling strength is 0.512 kgf, and the ion conductivity is 7.8 mS/cm. Moreover, the polymer composite membrane DF5 is baked for 1 h at 120° C., 140° C., 160° C., and 180° C., transverse thermal shrinkage percentages are respectively: 0.3%, 1%, 6.5%, and 86%, and longitudinal thermal shrinkage percentages are respectively: 0.5%, 1.5%, 5.5%, and 82.2%.

Embodiment 4 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Method for preparing a ceramic membrane: the same as that in Embodiment 3, and a ceramic membrane C1 is obtained.

(2) Form a heat-resistant fiber layer: with reference to Embodiment 3, a difference is in that, polyetherimide and polyvinylidene fluoride-hexafluoropropylene are mixed according to a weight ratio 3:1 to prepare a corresponding spinning solution, and a polymer composite membrane marked as F4 on which a heat-resistant fiber layer (whose thickness is 3 μm and porosity is 84.2%) is formed is prepared by using the foregoing spinning solution.

(3) Structure and performance representation of the polymer composite membrane:

The diameter of the fiber in the SEM image is measured by using TEM Macrography software, data is recorded, the finally calculated average fiber diameter is 186 nm, and calculation is performed according to the gravimetric method to learn that the surface density of the heat-resistant fiber layer is 1.22 g/m$^2$. Through testing, the transverse stretching strength and the longitudinal stretching strength of the polymer composite membrane F4 are respectively 124 Mpa and 129 MPa, the needling strength is 0.543 kgf, and the ion conductivity is 7.5 mS/cm. Moreover, the polymer composite membrane F4 is baked for 1 h at 120° C., 140° C., 160° C., and 180° C., transverse thermal shrinkage percentages are respectively: 0%, 0%, 1.5%, and 3.5%, and longitudinal thermal shrinkage percentages are respectively: 0%, 0%, 2.2%, and 4.5%.

Embodiment 5 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Prepare a ceramic membrane: the same as that in Embodiment 3, and a ceramic membrane C1 is obtained.

(2) Form a heat-resistant fiber layer: with reference to Embodiment 3, a difference is in that, polyetherimide and polyvinylidene fluoride-hexafluoropropylene are mixed according to a weight ratio 5:1 to prepare a corresponding spinning solution, and a polymer composite membrane marked as F5 on which a heat-resistant fiber layer (whose thickness is 3 μm and porosity is 83%) is formed is prepared by using the foregoing spinning solution.

(3) Structure and performance representation of the polymer composite membrane:

The diameter of the fiber in the SEM image is measured by using TEM Macrography software, data is recorded, the finally calculated average fiber diameter is 186 nm, and calculation is performed according to the gravimetric method to learn that the surface density of the heat-resistant fiber layer is 1.22 g/m$^2$.

Through testing, the transverse stretching strength and the longitudinal stretching strength of the polymer composite membrane F5 are respectively 125 Mpa and 129 MPa, the needling strength is 0.543 kgf, and the ion conductivity is 6.9 mS/cm. Moreover, the polymer composite membrane F5 is baked for 1 h at 120° C., 140° C., 160° C., and 180° C., transverse thermal shrinkage percentages are respectively: 0%, 0.5%, 2.5%, and 3.6%, and longitudinal thermal shrinkage percentages are respectively: 0%, 1.3%, 3%, and 4.6%.

Embodiment 6 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Prepare a ceramic membrane: the same as that in Embodiment 3, and a ceramic membrane C1 is obtained.

(2) Form a heat-resistant fiber layer: with reference to Embodiment 3, a difference is in that, polyetherimide and polyvinylidene fluoride-hexafluoropropylene are mixed according to a weight ratio 10:1 to prepare a corresponding spinning solution, and a polymer composite membrane marked as F6 on which a heat-resistant fiber layer (whose thickness is 3 μm and porosity is 86.4%) is formed is prepared by using the foregoing spinning solution.

(3) Structure and performance representation of the polymer composite membrane:

The diameter of the fiber in the SEM image is measured by using TEM Macrography software, data is recorded, the finally calculated average fiber diameter is 222 nm, and calculation is performed according to the gravimetric method to learn that the surface density of the heat-resistant fiber layer is 1.19 g/m$^2$.

Through testing, the transverse stretching strength and the longitudinal stretching strength of the polymer composite membrane F6 are respectively 121 Mpa and 125 MPa, the needling strength is 0.564 kgf, and the ion conductivity is 7.3 mS/cm. Moreover, the polymer composite membrane F6 is baked for 1 h at 120° C., 140° C., 160° C., and 180° C., transverse thermal shrinkage percentages are respectively: 0%, 0.5%, 3.5%, and 5.5%, and longitudinal thermal shrinkage percentages are respectively: 0%, 1.3%, 3%, and 7.5%. In the polymer composite membrane F6, because the porosity is increased, the ion conductivity thereof is improved. However, because the content of polyvinylidene fluoride-hexafluoropropylene is relatively low, the viscosity of the formed heat-resistant fiber layer is deteriorated. As a result, the stretching performance of the polymer composite membrane F6 is weakened, and the thermal shrinkage performance is also reduced.

Embodiment 7 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Prepare a ceramic membrane: the same as that in Embodiment 3, and a ceramic membrane C1 is obtained.

(2) Form a heat-resistant fiber layer: with reference to Embodiment 3, a difference is in that, the foregoing polyvinylidene fluoride-hexafluoropropylene is replaced with polyethylene oxide (which is commercially available from Aladdin Corporation, and whose weight-average molecular weight is 600000 g/mol, melting point is 130° C., glass transition temperature is −62° C., and liquid absorption rate in an electrolyte at 25° C. is 1000%) to prepare a spinning solution, and a polymer composite membrane F7 on which a heat-resistant fiber layer (whose thickness is 3 μm and porosity is 85%) is formed is prepared by using the foregoing spinning solution.

(3) Structure and performance representation of the polymer composite membrane:

The diameter of the fiber in the SEM image is measured by using TEM Macrography software, data is recorded, the finally calculated average fiber diameter is 230 nm, and calculation is performed according to the gravimetric method to learn that the surface density of the heat-resistant fiber layer is 1.30 g/m$^2$.

Through testing, the transverse stretching strength and the longitudinal stretching strength of the polymer composite membrane F7 are respectively 123 Mpa and 137 MPa, the needling strength is 0.529 kgf, and the ion conductivity is 7.9 mS/cm. Moreover, the polymer composite membrane F7 is baked for 1 h at 120° C., 140° C., 160° C., and 180° C., transverse thermal shrinkage percentages are respectively: 0%, 1.5%, 3%, and 8.6%, and longitudinal thermal shrinkage percentages are respectively: 0%, 1.15%, 2.5%, and 8.3%.

Embodiment 8 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Prepare a ceramic membrane: the same as that in Embodiment 3, and a ceramic membrane C1 is obtained.

(2) Form a heat-resistant fiber layer:

Polyetherimide is added into an NMP solution, the solution is magnetically stirred in water bath at 70° C. to fully dissolve the polyetherimide, to form a spinning solution A whose concentration is 30 wt %; and polyvinylidene fluoride-hexafluoropropylene is added into an NMP solution, the solution is magnetically stirred in water bath at 70° C. to fully dissolve the polyvinylidene fluoride-hexafluoropropylene, to form a spinning solution B whose concentration is 30 wt %.

The foregoing prepared ceramic membrane C1 wraps a roller (a collection device), and on a surface of the ceramic membrane C1 on which a ceramic layer is formed, electrostatic spinning is performed on the spinning solution A and the spinning solution B by using a needle electrostatic spinning method, where a weight ratio of polyetherimide in the spinning solution A to polyvinylidene fluoride-hexafluoropropylene in the spinning solution B is 1:1. Parameters for adjusting electrostatic spinning are as follows: the receiving distance is 12 cm, the temperature is 25° C., the humidity is 50%, the inner diameter of a needle is 0.46 mm, a movement speed of the needle is 6.6 mm/sec, the voltage is 10 kV, the stream velocity is 0.3 mL/h, and the rotational speed of the roller is 2000 rpm.

After electrostatic spinning ends, the foregoing ceramic membrane is taken down, mold pressing is performed for 1 min at a pressure of 15 MPa, and then air blowing and drying are performed for 24 h at 50° C., to obtain a polymer composite membrane F8 on which a heat-resistant fiber layer (whose thickness is 3 μm and porosity is 81.3%) is formed.

(3) Structure and performance representation of the polymer composite membrane:

The diameter of the fiber in the SEM image is measured by using TEM Macrography software, data is recorded, the finally calculated average fiber diameter is 246 nm, and calculation is performed according to the gravimetric method to learn that the surface density of the heat-resistant fiber layer is 1.31 g/m².

Through testing, the transverse stretching strength and the longitudinal stretching strength of the polymer composite membrane F8 are respectively 118 Mpa and 122 MPa, the needling strength is 0.544 kgf, and the ion conductivity is 7.6 mS/cm. Moreover, the polymer composite membrane F8 is baked for 1 h at 120° C., 140° C., 160° C., and 180° C., transverse thermal shrinkage percentages are respectively: 0%, 0%, 1.3%, and 3.8%, and longitudinal thermal shrinkage percentages are respectively: 0%, 0.05%, 2.3%, 5.5%.

Embodiment 9 (Preparing a Polymer Composite Membrane of a Three-Layered Structure of PE Base Membrane-Ceramic Layer-Heat-Resistant Fiber Layer)

This embodiment is used to describe a ceramic membrane and a method for preparing same provided in the disclosure.

(1) Prepare a ceramic membrane:

2 kg of boehmite (whose average particle size is 300 nm), 0.016 kg of sodium polyacrylate (whose number-average molecular weight is 9000 and which is commercially available from Guangzhou Yuanchang Commerce Co., Ltd.), 0.014 kg of sodium carboxymethyl nano-crystalline cellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of boehmite is 50 wt %, the mixture is stirred for 1.5 hours at 8000 rpm, then 0.01 kg of 3-glycidyloxypropyltrimethoxysilane is added to continue stirring for 1.5 hours, then 0.12 kg of polyacrylate binder (whose crosslinked monomer is N-methylolacrylamide, whose content is 3 wt %, and whose glass transition temperature is −40° C.) is added, stirring is performed for 1.5 hours at 3000 rpm, then 0.08 kg of sodium dodecylbenzenesulfonate is added, and stirring is performed for 1.5 hours at 3000 rpm, to obtain a ceramic layer slurry.

The foregoing ceramic layer slurry is applied onto one side surface of a PE base membrane whose thickness is 12 and drying is performed to obtain a ceramic layer whose thickness is 2 μm on the one side surface of the base membrane, to obtain a product, namely, a ceramic membrane C2. Through testing, the surface density of the ceramic layer of the ceramic membrane C2 at the thickness of 1 μm is 2.02 mg/cm², the air permeability is 198 s/100 ml, the peeling strength is 5.6 N, the thermal stability at 120° C. is A, and the thermal stability at 160° C. is A.

(2) Form a heat-resistant fiber layer: with reference to Embodiment 3, a difference is in that, the ceramic membrane C1 is replaced with the foregoing prepared ceramic membrane C2, to obtain a polymer composite membrane marked as F9 on which a heat-resistant fiber layer (whose thickness is 3 μm and porosity is 79%) is formed.

(3) Performance representation of the polymer composite membrane:

Through testing, the transverse stretching strength and the longitudinal stretching strength of the polymer composite membrane F9 are respectively 120 Mpa and 125 MPa, the needling strength is 0.544 kgf, and the ion conductivity is 7.8 mS/cm. Moreover, the polymer composite membrane F9 is baked for 1 h at 120° C., 140° C., 160° C., and 180° C., transverse thermal shrinkage percentages are respectively: 0%, 0%, 1.3%, and 3.8%, and longitudinal thermal shrinkage percentages are respectively: 0%, 0.05%, 2.3%, 5.35%.

Embodiment 10 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane:

2 kg of titanium dioxide (whose average particle size is 500 nm), 0.008 kg of sodium polyacrylate (whose number-average molecular weight is 9000 and which is commercially available from Guangzhou Yuanchang Commerce Co., Ltd.), 0.03 kg of sodium carboxymethyl nano-crystalline cellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of titanium dioxide is 25 wt %, the mixture is stirred for 1.5 hours at 4000 rpm, then 0.024 kg of 3-glycidyloxypropyltrimethoxysilane is added to continue stirring for 1.5 hours, then 0.08 kg of polyacrylate binder (whose crosslinked monomer is hydroxymethyl acrylate, whose content is 5 wt %, and whose glass transition temperature is 0° C.) is added, stirring is performed for 1.5 hours at 3000 rpm, then 0.08 kg of sodium dodecylbenzenesulfonate is added, and stirring is performed for 1.5 hours at 3000 rpm, to obtain a ceramic layer slurry.

The foregoing ceramic layer slurry is applied onto one side surface of a PE base membrane whose thickness is 12 μm, and drying is performed to obtain a ceramic layer whose thickness is 3.5 μm on the one side surface of the base membrane, to obtain a product, namely, a ceramic membrane C3. Through testing, the surface density of the ceramic layer of the ceramic membrane C3 at the thickness of 1 μm is 2.05 mg/cm², the air permeability is 200 s/100 ml, the peeling strength is 5.7 N, the thermal stability at 120° C. is A, and the thermal stability at 160° C. is A.

(2) Form a heat-resistant fiber layer: with reference to Embodiment 3, a difference is in that, the ceramic membrane C1 is replaced with the foregoing prepared ceramic membrane C3, to obtain a polymer composite membrane marked as F10 on which a heat-resistant fiber layer (whose thickness is 3 μm and porosity is 81.5%) is formed.

(3) Performance representation of the polymer composite membrane:

Through testing, the transverse stretching strength and the longitudinal stretching strength of the polymer composite membrane F10 are respectively 113 Mpa and 118 MPa, needling strength is 0.544 kgf, and the ion conductivity is 7.7 mS/cm. Moreover, the polymer composite membrane F10 is baked for 1 h at 120° C., 140° C., 160° C., and 180°

C., transverse thermal shrinkage percentages are respectively: 0%, 0%, 1.3%, and 3.6%, and longitudinal thermal shrinkage percentages are respectively: 0%, 0.06%, 2.3%, and 5.3%.

Embodiment 11 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane: with reference to Embodiment 3, a difference is in that, when a ceramic layer slurry is prepared, the use amount of a polyacrylate binder is 0.06 kg, and the content of a crosslinked monomer in the polyacrylate binder is 7 wt %, to obtain a ceramic membrane C4. Through testing, the surface density of the ceramic layer of the ceramic membrane C4 is 1.95 mg/cm$^2$, the air permeability is 208 s/100 ml, the peeling strength is 4.3 N, the thermal stability at 120° C. is A, and the thermal stability at 160° C. is A.

(2) Form a heat-resistant fiber layer: with reference to Embodiment 1, a difference is in that, the ceramic membrane C1 is replaced with the foregoing prepared ceramic membrane C4, to obtain a polymer composite membrane F11 on which a heat-resistant fiber layer is formed.

(3) Performance representation of the polymer composite membrane:

Through testing, the transverse stretching strength and the longitudinal stretching strength of the polymer composite membrane F11 are respectively 115 Mpa and 121 MPa, the needling strength is 0.544 kgf, and the ion conductivity is 7.6 mS/cm. Moreover, the polymer composite membrane F11 is baked for 1 h at 120° C., 140° C., 160° C., and 180° C., transverse thermal shrinkage percentages are respectively: 0%, 0%, 1.7%, and 4.0%, and longitudinal thermal shrinkage percentages are respectively: 0%, 0.08%, 2.5%, and 5.5%.

Embodiment 12 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane: with reference to Embodiment 3, a difference is in that, when a ceramic layer slurry is prepared, the use amount of a polyacrylate binder is 0.12 kg, the content of a crosslinked monomer in the polyacrylate binder is 5 wt %, and 3-glycidyloxypropyltrimethoxysilane is not added, to obtain a ceramic membrane C5. Through testing, the surface density of the ceramic layer of the ceramic membrane C5 is 1.91 mg/cm$^2$, the air permeability is 212 s/100 ml, the peeling strength is 4.5 N, the thermal stability at 120° C. is A, and the thermal stability at 160° C. is A.

(2) Form a heat-resistant fiber layer: with reference to Embodiment 1, a difference is in that, the porous membrane PE is replaced with the foregoing prepared ceramic membrane C5, to obtain a polymer composite membrane F12 on which a heat-resistant fiber layer is formed.

(3) Performance representation of the polymer composite membrane:

Through testing, the transverse stretching strength and the longitudinal stretching strength of the polymer composite membrane F12 are respectively 116 Mpa and 120 MPa, the needling strength is 0.544 kgf, and the ion conductivity is 7.5 mS/cm. Moreover, the polymer composite membrane F12 is baked for 1 h at 120° C., 140° C., 160° C., and 180° C., transverse thermal shrinkage percentages are respectively: 0%, 0.08%, 2.3%, and 4.2%, and longitudinal thermal shrinkage percentages are respectively: 0%, 0.1%, 2.6%, and 5.8%.

Embodiment 13 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane: with reference to Embodiment 3, a difference is in that, when a ceramic layer slurry is prepared, the use amount of a polyacrylate binder is 0.08 kg, and the content of a crosslinked monomer in the polyacrylate binder is 2 wt %, to obtain a ceramic membrane C6. Through testing, the surface density of the ceramic layer of the ceramic membrane C6 is 2 mg/cm$^2$, the air permeability is 207 s/100 ml, the peeling strength is 4.6 N, the thermal stability at 120° C. is A, and the thermal stability at 160° C. is A.

(2) Form a heat-resistant fiber layer: with reference to Embodiment 3, a difference is in that, the ceramic membrane C1 is replaced with the foregoing prepared ceramic membrane C6, to obtain a polymer composite membrane F13 on which a heat-resistant fiber layer is formed.

(3) Performance representation of the polymer composite membrane:

Through testing, the transverse stretching strength and the longitudinal stretching strength of the polymer composite membrane F13 are respectively 115 Mpa and 122 MPa, the needling strength is 0.544 kgf, and the ion conductivity is 7.4 mS/cm. Moreover, the polymer composite membrane F13 is baked for 1 h at 120° C., 140° C., 160° C., and 180° C., transverse thermal shrinkage percentages are respectively: 0%, 0%, 1.9%, and 4.5%, and longitudinal thermal shrinkage percentages are respectively: 0%, 0.05%, 2.2%, and 5.5%.

Embodiment 14 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane: with reference to Embodiment 3, a difference is in that, the average particle size of aluminum oxide is 700 nm, and a ceramic membrane C7 is obtained. Through testing, the surface density of the ceramic layer of the ceramic membrane C7 is 2.11 mg/cm$^2$, the air permeability is 205 s/100 ml, the peeling strength is 4.7 N, the thermal stability at 120° C. is A, and the thermal stability at 160° C. is A.

(2) Form a heat-resistant fiber layer: with reference to Embodiment 3, a difference is in that, the ceramic membrane C1 is replaced with the foregoing prepared ceramic membrane C7, to obtain a polymer composite membrane F14 on which a heat-resistant fiber layer is formed.

(3) Performance representation of the polymer composite membrane:

Through testing, the transverse stretching strength and the longitudinal stretching strength of the polymer composite membrane F14 are respectively 116 Mpa and 120 MPa, the needling strength is 0.544 kgf, and the ion conductivity is 7.2 mS/cm. Moreover, the polymer composite membrane F14 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

Embodiment 15 (Preparing a Polymer Composite Membrane of a Three-Layered Structure of PE Base Membrane-Ceramic Layer-Heat-Resistant Fiber Layer)

This embodiment is used to describe a polymer composite membrane and a method for preparing same provided in the disclosure.

(1) Prepare a ceramic membrane: with reference to Embodiment 3, a difference is in that, the average particle size of aluminum oxide is 250 nm, and a ceramic membrane C8 is obtained. Through testing, the surface density of the ceramic layer of the ceramic membrane C8 is 1.91 mg/cm$^2$, the air permeability is 208 s/100 ml, the peeling strength is 4.8 N, the thermal stability at 120° C. is A, and the thermal stability at 160° C. is A.

(2) Form a heat-resistant fiber layer: with reference to Embodiment 3, a difference is in that, the ceramic membrane C1 is replaced with the foregoing prepared ceramic membrane C8, to obtain a polymer composite membrane F15 on which a heat-resistant fiber layer is formed.

(3) Performance representation of the polymer composite membrane:

Through testing, the transverse stretching strength and the longitudinal stretching strength of the polymer composite membrane F15 are respectively 115 Mpa and 124 MPa, the needling strength is 0.544 kgf, and the ion conductivity is 7.0 mS/cm. Moreover, the polymer composite membrane F15 is baked for 1 h at 120° C., 140° C., 160° C., and 180° C., transverse thermal shrinkage percentages are respectively: 0%, 0%, 1.5%, and 3.8%, and longitudinal thermal shrinkage percentages are respectively: 0%, 0.08%, 2.4%, and 5.2%.

Embodiment 16 (Preparing a Polymer Composite Membrane of a Four-Layered Structure of Ceramic Layer-PE Base Membrane-Ceramic Layer-Heat-Resistant Fiber Layer)

This embodiment is used to describe a polymer composite membrane and a method for preparing same provided in the disclosure.

(1) Prepare a ceramic layer: a first ceramic layer (whose thickness is 1.25 μm) is first formed on a side of a PE base membrane by using the method in Embodiment 3, and then a second ceramic layer (whose thickness is 1.25 μm) is formed on another side of the PE base membrane, to form a ceramic membrane C9.

(2) Form a heat-resistant fiber layer: a heat-resistant fiber layer (whose thickness is 3 μm and porosity is 85%) is formed on a surface of the first ceramic layer of the foregoing ceramic membrane C9 by using the method in Embodiment 3, to obtain a polymer composite membrane F16.

Through testing, the transverse stretching strength and the longitudinal stretching strength of the polymer composite membrane F16 are respectively 117 Mpa and 122 MPa, the needling strength is 0.53 kgf, and the ion conductivity is 7.8 mS/cm. Moreover, the polymer composite membrane F16 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

Embodiment 17 (Preparing a Polymer Composite Membrane of a Five-Layered Structure of Heat-Resistant Fiber Layer-Ceramic Layer-PE Base Membrane-Ceramic Layer-Heat-Resistant Fiber Layer)

This embodiment is used to describe a polymer composite membrane and a method for preparing same provided in the disclosure.

(1) Prepare a ceramic layer: the same as that in Embodiment 16, and a ceramic membrane C9 is obtained.

(2) Form a heat-resistant fiber layer: a first heat-resistant fiber layer (whose thickness is 3 μm and porosity is 85%) is first formed on a surface of a first ceramic layer of the foregoing ceramic membrane C9 by using the method in Embodiment 3, and then a second heat-resistant fiber layer (whose thickness is 3 μm and porosity is 85%) is formed on a surface of a second ceramic layer of the ceramic membrane C9, to obtain a polymer composite membrane F17.

Through testing, the transverse stretching strength and the longitudinal stretching strength of the polymer composite membrane F17 are respectively 115 Mpa and 121 MPa, the needling strength is 0.53 kgf, and the ion conductivity is 7.8 mS/cm. Moreover, the polymer composite membrane F17 is baked for 1 h at 120° C., 140° C., 160° C., and 180° C., transverse thermal shrinkage percentages are respectively: 0%, 0%, 1%, and 3.2%, and longitudinal thermal shrinkage percentages are respectively: 0%, 0.04%, 2%, and 4.5%.

Embodiment 18 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is 5601) whose solid contents are in a mass ratio of 9:1:10 are mixed, an appropriate amount of water is added, and stirring is performed evenly to prepare a slurry whose total solid content is 1 wt %.

The foregoing slurry is sprayed onto a surface of the heat-resistant fiber layer of the polymer composite membrane F3 and a side surface of a PTFE plate by using a spraying method (the spraying temperature is 40° C.), and then drying is performed at 50° C., to respectively obtain a polymer composite membrane Sa1 including a bonding layer (porous self-crosslinking polymer membrane, the same below) and a porous self-crosslinking polymer membrane Sb 1 on the PTFE plate, where the single-sided surface density of the bonding layer is 0.1 g/m$^2$, and the single-sided thickness is 0.2 Moreover, through testing, the porosity of the foregoing prepared porous self-crosslinking polymer membrane Sb1 is 62%, the liquid absorption rate is 263%, and the conductivity is 8.33 mS/cm. Moreover, through testing, the ion conductivity of the polymer composite membrane Sa1 is 8.3 mS/cm.

Bonding layer implementation comparison example (preparing a polymer composite membrane of a four-layered structure of PE base membrane-ceramic layer-heat-resistant fiber layer-bonding layer)

This implementation comparison example is used to comparatively describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer: A slurry and a bonding layer are prepared according to the method in Embodiment 18, and a difference is in that, a method for forming a bonding layer is a blade coating method, and a polymer composite membrane Da1 including a bonding layer and a compact self-crosslinking polymer membrane db1 on a PTFE plate are respectively obtained, where the single-sided surface density of the compact self-crosslinking polymer membrane is 1.5 g/m$^2$, and the single-sided thickness is 3 Moreover, through testing, the porosity of the foregoing prepared porous self-crosslinking polymer membrane db1 is 0%, the liquid absorption rate is 130%, and the conductivity is 5.11 mS/cm. Moreover, through testing, the ion conductivity of the polymer composite membrane Da1 is 5.05 mS/cm.

Embodiment 19 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A copolymer emulsion of vinylidene fluoride and hexafluoropropylene (which is commercially available from Arkema and whose trade mark is 10278), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is 5601) whose solid contents are in a mass ratio of 12:4:4 are mixed, and an appropriate amount of water is added, and stirring is performed evenly to prepare a bonding layer slurry whose total solid content is 5 wt %.

The foregoing bonding layer slurry is printed onto a surface of the heat-resistant fiber layer of the polymer composite membrane F3 and a side surface of a PTFE plate by using a screen-printing method (the temperature is 75° C.), and then drying is performed at 50° C., to respectively obtain a polymer composite membrane Sa2 including a bonding layer and a porous self-crosslinking polymer membrane Sb2 on the PTFE plate, where the single-sided surface density of the bonding layer is 0.2 g/m$^2$, and the single-sided thickness is 0.4 μm. Moreover, through testing, the porosity of the foregoing prepared porous self-crosslinking polymer membrane Sb2 is 48%, the liquid absorption rate is 192%, and the conductivity is 7.52 mS/cm. Moreover, through testing, the ion conductivity of the polymer composite membrane Sa2 is 7.45 mS/cm.

Embodiment 20 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is 5601) whose solid contents are in a mass ratio of 12:6:1:1 are mixed, and an appropriate amount of water is added, and stirring is performed evenly to prepare a bonding layer slurry whose total solid content is 10 wt %.

The foregoing bonding layer slurry is sprayed onto a surface of the heat-resistant fiber layer of the polymer composite membrane F3 and a side surface of a PTFE plate by using a spraying method (the temperature is 58° C.), and then drying is performed at 50° C., to respectively obtain a polymer composite membrane Sa3 including a bonding layer and a porous self-crosslinking polymer membrane Sb3 on the PTFE plate, where the single-sided surface density of the bonding layer is 0.3 g/m$^2$, and the single-sided thickness is 0.3 Through testing, the porosity of the foregoing prepared porous self-crosslinking polymer membrane Sb3 is 51%, the liquid absorption rate is 300%, and the conductivity is 7.14 mS/cm. Moreover, through testing, the ion conductivity of the polymer composite membrane Sa3 is 7.04 mS/cm.

Embodiment 21 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 12.7:6.3:1 are mixed, and an appropriate amount of water is added, and stirring is performed evenly to prepare a bonding layer slurry whose total solid content is 1 wt %.

The foregoing bonding layer slurry is printed onto a surface of the heat-resistant fiber layer of the polymer composite membrane F3 and a side surface of a PTFE plate by using a screen-printing method (the temperature is 40° C.), and then drying is performed at 50° C., to respectively obtain a polymer composite membrane Sa4 including a bonding layer and a porous self-crosslinking polymer membrane Sb4 on the PTFE plate, where the single-sided surface density of the bonding layer is 0.1 g/m², and the single-sided thickness is 0.2 Through testing, the porosity of the foregoing prepared porous self-crosslinking polymer membrane Sb4 is 53%, the liquid absorption rate is 311%, and the conductivity is 7.52 mS/cm. Moreover, through testing, the ion conductivity of the polymer composite membrane Sa4 is 7.5 mS/cm.

Embodiment 22 (Preparing a Polymer Composite Membrane of a Five-Layered Structure of Bonding Layer-PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is 5601) whose solid contents are in a mass ratio of 6:1:13 are mixed, an appropriate amount of water is added, and stirring is performed evenly to prepare a bonding layer slurry whose total solid content is 5 wt %.

The foregoing slurry is sprayed onto a surface of the heat-resistant fiber layer of the polymer composite membrane F3 and a side surface of a PTFE plate by using a spraying method (the temperature is 75° C.), and then drying is performed at 50° C., to respectively obtain a polymer composite membrane Sa5 including a bonding layer and a porous self-crosslinking polymer membrane Sb5 on the PTFE plate, where the single-sided surface density of the bonding layer is 0.2 g/m², and the single-sided thickness is 0.3 Through testing, the porosity of the foregoing prepared porous self-crosslinking polymer membrane Sb5 is 46%, the liquid absorption rate is 220%, and the conductivity is 7.39 mS/cm. Moreover, through testing, the ion conductivity of the polymer composite membrane Sa5 is 7.19 mS/cm.

Embodiment 23 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 11.4:7.6:1 are mixed, and an appropriate amount of water is added, and stirring is performed evenly to prepare a bonding layer slurry whose total solid content is 10 wt %.

The foregoing slurry is printed onto a surface of the heat-resistant fiber layer of the polymer composite membrane F3 and a side surface of a PTFE plate by using a screen-printing method (the temperature is 75° C.), and then drying is performed at 50° C., to respectively obtain a polymer composite membrane Sa6 including a bonding layer and a porous self-crosslinking polymer membrane Sb6 on the PTFE plate, where the single-sided surface density of the bonding layer is 0.3 g/m², and the single-sided thickness is 0.6 Through testing, the porosity of the foregoing prepared porous self-crosslinking polymer membrane Sb6 is 55%, the liquid absorption rate is 287%, and the conductivity is 7.91 mS/cm. Moreover, through testing, the ion conductivity of the polymer composite membrane Sa6 is 7.81 mS/cm.

Embodiment 24 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 9.5:9.5:1 are mixed, and an appropriate amount of water is added, and stirring is performed evenly to prepare a bonding layer slurry whose total solid content is 1 wt %.

The foregoing slurry is sprayed onto a surface of the heat-resistant fiber layer of the polymer composite membrane F3 and a side surface of a PTFE plate by using a spraying method (the temperature is 40° C.), and then drying is performed at 50° C., to respectively obtain a polymer composite membrane Sa1 including a bonding layer and a porous self-crosslinking polymer membrane Sb7 on the PTFE plate, where the single-sided surface density of the bonding layer is 0.1 g/m$^2$, and the single-sided thickness is 0.2 Through testing, the porosity of the foregoing prepared porous self-crosslinking polymer membrane Sb7 is 59%, the liquid absorption rate is 252%, and the conductivity is 8.12 mS/cm. Moreover, through testing, the ion conductivity of the polymer composite membrane Sa1 is 8 mS/cm.

Embodiment 25 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A copolymer emulsion of vinylidene fluoride and hexafluoropropylene (which is commercially available from Arkema and whose trade mark is 10278) and a self-crosslinking pure acrylic emulsion (which is commercially available from Shanghai Aigao Chemical Co., Ltd. and whose trade mark is 1005) whose solid contents are in a mass ratio of 19:1 are mixed, and an appropriate amount of water is added, and stirring is performed evenly to prepare a bonding layer slurry whose total solid content is 5 wt %.

The foregoing slurry is printed onto a surface of the heat-resistant fiber layer of the polymer composite membrane F3 and a side surface of a PTFE plate by using a screen-printing method (the temperature is 75° C.), and then drying is performed at 50° C., to respectively obtain a polymer composite membrane Sa8 including a bonding layer and a porous self-crosslinking polymer membrane Sb8 on the PTFE plate, where the single-sided surface density of the bonding layer is 0.2 g/m$^2$, and the single-sided thickness is 0.4 Through testing, the porosity of the foregoing prepared porous self-crosslinking polymer membrane Sb8 is 54%, the liquid absorption rate is 76%, and the conductivity is 7.86 mS/cm. Moreover, through testing, the ion conductivity of the polymer composite membrane Sa8 is 7.6 mS/cm.

Embodiment 26 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer:

A copolymer emulsion of vinylidene fluoride and hexafluoropropylene (which is commercially available from Arkema and whose trade mark is 10278) and a self-crosslinking pure acrylic emulsion (which is commercially available from Shanghai Aigao Chemical Co., Ltd. and whose trade mark is 1005) whose solid contents are in a mass ratio of 18:2 are mixed, and an appropriate amount of water is added, and stirring is performed evenly to prepare a bonding layer slurry whose total solid content is 10 wt %.

The foregoing slurry is sprayed onto a surface of the heat-resistant fiber layer of the polymer composite membrane F3 and a side surface of a PTFE plate by using a spraying method (the temperature is 58° C.), and then drying is performed at 50° C., to respectively obtain a polymer composite membrane Sa9 including a bonding layer and a porous self-crosslinking polymer membrane Sb9 on the PTFE plate, where the single-sided surface density of the bonding layer is 0.3 g/m$^2$, and the single-sided thickness is 0.6 μm. Through testing, the porosity of the foregoing prepared porous self-crosslinking polymer membrane Sb9 is 47%, the liquid absorption rate is 112%, and the conductivity is 7.4 mS/cm. Moreover, through testing, the ion conductivity of the polymer composite membrane Sa9 is 7.3 mS/cm.

Embodiment 27 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F2 is obtained.

(3) Form a bonding layer: with reference to Embodiment 17, a difference is in that, the bonding layer slurry further contains a copolymer emulsion of acrylonitrile and acrylate (which is commercially available from Shanghai Aigao Chemical Co., Ltd. and whose trade mark is A1030, where a polyacrylonitrile chain segment accounts for 15 wt %, a polybutyl acrylate chain segment accounts for 30 wt %, a polymethyl methacrylate chain segment accounts for 45 wt %, a polyethylene acrylate chain segment accounts for 5 wt %, a polyacrylic acid chain segment accounts for 5 wt %, the glass transition temperature Tg=28° C., and the solid content is 50 wt %), and a weight ratio of the solid content of A1030 to the total solid content of 1040 and 1005 is 1:1.

The bonding layer slurry is sprayed onto a surface of the heat-resistant fiber layer of the polymer composite membrane F2 and a side surface of a PTFE plate by using a spraying method (the temperature is 40° C.), and then drying is performed at 50° C., to respectively obtain a polymer composite membrane Sa10 including a bonding layer and a porous self-crosslinking polymer membrane Sb10 on the PTFE plate, where the single-sided surface density of the bonding layer is 0.1 g/m², and the single-sided thickness is 0.2 Through testing, the porosity of the foregoing prepared porous self-crosslinking polymer membrane Sb10 is 48%, the liquid absorption rate is 293%, and the conductivity is 7.88 mS/cm. Moreover, through testing, the ion conductivity of the polymer composite membrane Sa10 is 7.7 mS/cm.

Embodiment 28 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer: with reference to Embodiment 17, a difference is in that, the bonding layer slurry further contains a vinyl chloride-propylene emulsion (which is commercially available from Shanghai Aigao Chemical Co., Ltd. and whose trade mark is C056, where the glass transition temperature Tg=10° C., and the solid content is 45 wt %), and a weight ratio of the solid content of C056 to the total solid content of 1040 and 1005 is 3:1.

The bonding layer slurry is sprayed onto a surface of the heat-resistant fiber layer of the polymer composite membrane F3 and a side surface of a PTFE plate by using a spraying method (the temperature is 40° C.), and then drying is performed at 50° C., to respectively obtain a polymer composite membrane Sa11 including a bonding layer and a porous self-crosslinking polymer membrane Sb11 on the PTFE plate, where the single-sided surface density of the bonding layer is 0.1 g/m², and the single-sided thickness is 0.2 Through testing, the porosity of the foregoing prepared porous self-crosslinking polymer membrane Sb11 is 50%, the liquid absorption rate is 214%, and the conductivity is 7.31 mS/cm. Moreover, through testing, the ion conductivity of the polymer composite membrane Sa11 is 7.22 mS/cm.

Embodiment 29 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer: with reference to Embodiment 17, a difference is in that, the bonding layer slurry further contains a vinyl chloride-propylene emulsion (which is commercially available from Shanghai Aigao Chemical Co., Ltd. and whose trade mark is C056, where the glass transition temperature Tg=10° C., and the solid content is 45 wt %), and a weight ratio of the solid content of C056 to the total solid content of 1040 and 1005 is 1:1.

The bonding layer slurry is sprayed onto a surface of the heat-resistant fiber layer of the polymer composite membrane F3 and a side surface of a PTFE plate by using a spraying method (the temperature is 40° C.), and then drying is performed at 50° C., to respectively obtain a polymer composite membrane Sa12 including a bonding layer and a porous self-crosslinking polymer membrane Sb12 on the PTFE plate, where the single-sided surface density of the bonding layer is 0.1 g/m², and the single-sided thickness is 0.2 Through testing, the porosity of the foregoing prepared porous self-crosslinking polymer membrane Sb12 is 46%, the liquid absorption rate is 182%, and the conductivity is 7.26 mS/cm. Moreover, through testing, the ion conductivity of the polymer composite membrane Sa12 is 7.3 mS/cm.

Embodiment 30 (Preparing a Polymer Composite Membrane of a Four-Layered Structure of PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic membrane: the same as that in Embodiment 3, and a ceramic membrane C1 is obtained.

(2) Form a heat-resistant fiber layer: the same as that in Embodiment 3, and a polymer composite membrane F3 is obtained.

(3) Form a bonding layer: with reference to Embodiment 17, a difference is in that, the self-crosslinking pure acrylic emulsion 1005 is replaced with the self-crosslinking pure acrylic emulsion 1020 having same parts by weight.

The bonding layer slurry is printed onto a surface of the heat-resistant fiber layer of the polymer composite membrane F3 and a side surface of a PTFE plate by using a screen-printing method (the temperature is 75° C.), and then drying is performed at 50° C., to respectively obtain a polymer composite membrane Sa13 including a bonding layer and a porous self-crosslinking polymer membrane Sb13 on the PTFE plate, where the single-sided surface density of the bonding layer is 0.2 g/m², and the single-sided thickness is 0.4 Through testing, the porosity of the foregoing prepared porous self-crosslinking polymer membrane Sb13 is 47%, the liquid absorption rate is 160%, and the conductivity is 7.16 mS/cm. Moreover, through testing, the ion conductivity of the polymer composite membrane Sa13 is 7.02 mS/cm.

Embodiment 31 (Preparing a Polymer Composite Membrane of a Seven-Layered Structure of Bonding Layer-Heat-Resistant Fiber Layer-Ceramic Layer-PE Base Membrane-Ceramic Layer-Heat-Resistant Fiber Layer-Bonding Layer)

This embodiment is used to describe a polymer composite membrane and a method for preparing same provided in the disclosure.

(1) Prepare a ceramic layer: the same as that in Embodiment 16, and a ceramic membrane C9 is formed.

(2) Form a heat-resistant fiber layer: the same as that in Embodiment 17, and a polymer composite membrane F17 is obtained.

(3) Form a heat-resistant fiber layer: with reference to Embodiment 17, by using the method in Embodiment 17, a first bonding layer (whose thickness is 0.1 µm) is first formed on a surface of a first heat-resistant fiber layer of the polymer composite membrane F17, and then a second bonding layer (whose thickness is 0.1 µm) is formed on a surface of a second heat-resistant fiber layer of the polymer composite membrane F17, to obtain a polymer composite membrane Sa14. Moreover, through testing, the ion conductivity of the polymer composite membrane Sa14 is 8.37 mS/cm.

The implementations of the disclosure are described in detail above. However, the disclosure is not limited to specific details in the foregoing implementations. Within the scope of the technical idea of the disclosure, a plurality of simple variances may be performed on the technical solutions of the disclosure, and these simple variances all fall within the protection scope of the disclosure.

In addition, it should be noted that, specific technical features described in the foregoing specific implementations may be combined in any appropriate manner without conflict. To avoid unnecessary repetition, various possible combination manners are not further described in the disclosure.

Moreover, various different implementations of the disclosure may also be randomly combined with each other. Provided that the combination does not depart from the idea of the disclosure, the combination should be similarly considered as the content disclosed in the disclosure.

What is claimed is:

1. A polymer composite membrane,
comprising a porous base membrane;
a heat-resistant fiber layer covering at least one side surface of the porous base membrane, wherein materials of the heat-resistant fiber layer contain a first polymeric material and a second polymeric material; the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%; and
a bonding layer formed on an outermost side of at least one side surface of the polymer composite membrane, the bonding layer comprising:
an acrylate crosslinked polymer, a styrene-acrylate crosslinked copolymer and a vinylidene fluoride-hexafluoropropylene copolymer, or
an acrylate crosslinked polymer and a styrene-acrylate crosslinked copolymer, or
an acrylate crosslinked polymer and a vinylidene fluoride-hexafluoropropylene copolymer, and the porosity of the bonding layer is 40% to 65%; and
wherein the glass transition temperature of the acrylate crosslinked polymer is −20° C. to 60° C., the glass transition temperature of the styrene-acrylate crosslinked copolymer is −30° C. to 50° C., and the glass transition temperature of the vinylidene fluoride-hexafluoropropylene copolymer is −65° C. to −40° C.

2. The polymer composite membrane according to claim 1, wherein a liquid absorption rate of the first polymeric material in an electrolyte at 25° C. is below 5% and has an error of ±5%; and a liquid absorption rate of the second polymeric material in an electrolyte at 25° C. is 40% to 100% and has an error of ±5%.

3. The polymer composite membrane according to claim 1, wherein the glass transition temperature of the first polymeric material is above 100° C.; and the melting point of the second polymeric material is 100° C. to 150° C.; and optionally, the glass transition temperature of the second polymeric material is below 25° C.

4. The polymer composite membrane according to claim 1, wherein a weight ratio between the first polymeric material and the second polymeric material in the heat-resistant fiber layer is (0.5 to 10):1.

5. The polymer composite membrane according to claim 1, wherein
the first polymeric material is selected from one or more of polyetherimide, poly(ether ether ketone), polyether sulfone, polyamide-imide, polyamic acid, and polyvinylpyrrolidone; and
the second polymeric material is selected from one or more of modified polyvinylidene fluoride, polyacrylate, polyphenyl ethylene, and polyethylene oxide.

6. The polymer composite membrane according to claim 5, wherein the first polymeric material is polyetherimide, and the second polymeric material is polyvinylidene fluoride-hexafluoropropylene.

7. The polymer composite membrane according to claim 1, wherein the diameter of fiber in the heat-resistant fiber layer is 100 nm to 2000 nm, and the thickness of the heat-resistant fiber layer is 0.5 µm to 30 µm.

8. The polymer composite membrane according to claim 1, wherein the heat-resistant fiber layer has a porosity of 75% to 93% and a surface density of 0.2 g/m² to 15 g/m².

9. The polymer composite membrane according to claim 1, wherein the porous base membrane is:
a polymer base membrane, which is a polyolefin membrane, or
a ceramic membrane comprising a polymer base membrane and a ceramic layer formed on at least a side surface of the polymer base membrane, wherein the polymer base membrane is a polyolefin membrane,
and the heat-resistant fiber layer is located on a surface on a side of the ceramic membrane on which the ceramic layer is formed.

10. The polymer composite membrane according to claim 9, wherein the ceramic layer contains ceramic particles and a binder, and a surface density ρ of the ceramic layer at a thickness of 1 µm satisfies 1.8 mg/cm² < ρ ≤ 2.7 mg/cm²;
the ceramic particles are selected from one or more of $Al_2O_3$, $SiO_2$, $BaSO_4$, BaO, $TiO_2$, CuO, MgO, $Mg(OH)_2$, $LiAlO_2$, $ZrO_2$, carbon nanotube (CNT), BN, SiC, $Si_3N_4$, WC, $B_4C$, AlN, $Fe_2O_3$, $BaTiO_3$, $MoS_2$, $\alpha$-$V_2O_5$, $PbTiO_3$, $TiB_2$, $CaSiO_3$, molecular sieve, clay, boehmite, and kaolin, and optionally, an average particle size of the ceramic particles is 200 nm to 800 nm;
the binder is polyacrylate whose glass transition temperature satisfies −40° C. to 0° C.; and
the single-sided thickness of the ceramic layer is 1 µm to 5 µm.

11. The polymer composite membrane according to claim 9, wherein in the ceramic layer, relative to the ceramic particles of 100 parts by weight, the content of the binder is 2 to 8 parts by weight;
in the ceramic layer, relative to the ceramic particles of 100 parts by weight, a dispersant of 0.3 to 1 part by weight, a thickener of 0.5 to 1.8 parts by weight, and a surface treating agent of 0 to 1.5 parts by weight are further comprised, and the number-average molecular weight of the dispersant is below 50000;
the dispersant is at least one of polyacrylate, aliphatic polyglycol ether, silicates, phosphates, and guar gum;
the thickener is at least one of polyacrylate having a number-average molecular weight of 300000 to 1500000, a polyacrylate copolymer, polyvinylpyrrolidone, a cellulose derivative, and polyacrylamide; and
the surface treating agent is 3-glycidyloxypropyltrimethoxysilane and/or 3-glycidyloxypropyltriethoxysilane.

12. The polymer composite membrane according to claim 1, wherein
the bonding layer contains the acrylate crosslinked polymer and the styrene-acrylate crosslinked copolymer and does not contain the vinylidene fluoride-hexafluoropropylene copolymer, and a weight ratio of the acrylate crosslinked polymer to the styrene-acrylate crosslinked copolymer is 1:(0.05 to 2); or
the bonding layer contains the acrylate crosslinked polymer and the vinylidene fluoride-hexafluoropropylene copolymer and does not contain the styrene-acrylate crosslinked copolymer, and a weight ratio of the acrylate crosslinked polymer to the vinylidene fluoride-hexafluoropropylene copolymer is 1:(0.3 to 25); or
the bonding layer contains the acrylate crosslinked polymer, the styrene-acrylate crosslinked polymer, and the vinylidene fluoride-hexafluoropropylene copolymer, and a weight ratio between the acrylate crosslinked polymer, the styrene-acrylate crosslinked copolymer and the vinylidene fluoride-hexafluoropropylene copolymer is 1:(0.01 to 2):(0.3 to 5).

13. The polymer composite membrane according to claim 1, wherein the acrylate crosslinked polymer is:
a mixture of a first acrylate crosslinked polymer and a second acrylate crosslinked polymer and/or a third acrylate crosslinked polymer, or
a second acrylate crosslinked polymer, or
a third acrylate crosslinked polymer;
the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %,
the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %,
and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %;
the glass transition temperature of the first acrylate crosslinked polymer is 50° C. to 60° C., the glass transition temperature of the second acrylate crosslinked polymer is −20° C. to −5° C., and the glass transition temperature of the third acrylate crosslinked polymer is 30° C. to 50° C.;
the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %;
and the glass transition temperature of the styrene-acrylate crosslinked copolymer is 15° C. to 30° C.; and
the vinylidene fluoride-hexafluoropropylene copolymer contains a vinylidene fluoride chain segment of 80 to 98 wt % and a hexafluoropropylene chain segment of 2 to 20 wt %; and
the glass transition temperature of the vinylidene fluoride-hexafluoropropylene copolymer is −60° C. to −40° C.

14. The polymer composite membrane according to claim 1, wherein
the bonding layer contains a first acrylate crosslinked polymer, a second acrylate crosslinked polymer and the styrene-acrylate crosslinked copolymer and does not contain the vinylidene fluoride-hexafluoropropylene copolymer, and a weight ratio between the first acrylate crosslinked polymer, the second acrylate crosslinked polymer, and the styrene-acrylate crosslinked copolymer is (5 to 10):1:(10 to 13); or
the bonding layer contains a first acrylate crosslinked polymer, a second acrylate crosslinked polymer, and the vinylidene fluoride-hexafluoropropylene copolymer and does not contain the styrene-acrylate crosslinked copolymer, and a weight ratio between the first acrylate crosslinked polymer, the second acrylate crosslinked polymer, and the vinylidene fluoride-hexafluoropropylene copolymer is (5 to 15):1:(5 to 12); or
the bonding layer contains a second acrylate crosslinked polymer and the vinylidene fluoride-hexafluoropropylene copolymer and does not contain the styrene-acrylate crosslinked copolymer, and a weight ratio between the second acrylate crosslinked polymer and the vinylidene fluoride-hexafluoropropylene copolymer is 1:(15 to 20); or
the bonding layer contains a second acrylate crosslinked polymer, the styrene-acrylate crosslinked copolymer, and the vinylidene fluoride-hexafluoropropylene copolymer, and a weight ratio between the second acrylate crosslinked polymer, the styrene-acrylate crosslinked copolymer, and the vinylidene fluoride-hexafluoropropylene copolymer is 1:(0.5 to 2):(1 to 5); or
the bonding layer contains a third acrylate crosslinked polymer, the styrene-acrylate crosslinked copolymer, and the vinylidene fluoride-hexafluoropropylene copolymer, and a weight ratio between the third acrylate crosslinked polymer, the styrene-acrylate crosslinked polymer, and the vinylidene fluoride-hexafluoropropylene copolymer is 1:(0.5 to 2):(1 to 5); or
the bonding layer contains a first acrylate crosslinked polymer, a second acrylate crosslinked polymer, the styrene-acrylate crosslinked copolymer, and the vinylidene fluoride-hexafluoropropylene copolymer, and a weight ratio between the first acrylate crosslinked polymer, the second acrylate crosslinked polymer, the styrene-acrylate crosslinked copolymer, and the vinylidene fluoride-hexafluoropropylene copolymer is (10 to 15):1:(0.5 to 2):(5 to 10), wherein
the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %,
the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer contains a vinylidene fluoride chain segment of 80 to 98 wt % and a hexafluoropropylene chain segment of 2 to 20 wt %; and the glass transition temperature of the first acrylate crosslinked polymer is 50° C. to 60° C., the glass transition temperature of the second acrylate crosslinked polymer is −20° C. to −5° C., and the glass transition temperature of the third acrylate crosslinked polymer is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

15. The polymer composite membrane according to claim 1, wherein the bonding layer further contains at least one of an acrylonitrile-acrylate copolymer, a vinyl chloride-propylene copolymer, and a butadiene-styrene copolymer;

when the bonding layer further contains the acrylonitrile-acrylate copolymer, and a weight ratio between the acrylonitrile-acrylate copolymer and the acrylate crosslinked polymer is (0.05 to 2):1;

when the bonding layer further contains the vinyl chloride-propylene copolymer, and a weight ration between the vinyl chloride-propylene copolymer and the acrylate crosslinked polymer is (0.15 to 7):1; and when the bonding layer further contains the butadiene-styrene copolymer, and a weight ratio between the butadiene-styrene copolymer and the acrylate crosslinked polymer is (0.05 to 2):1.

16. The polymer composite membrane according to claim 1, wherein the single-sided surface density of the bonding layer is 0.05 mg/cm² to 0.9 mg/cm²; and the single-sided thickness of the bonding layer is 0.1 μm to 1 μm.

17. A lithium-ion battery, comprising a positive electrode, a negative electrode, and a battery membrane located between the positive electrode and the negative electrode, wherein the battery membrane is the polymer composite membrane according to claim 1.

18. A method for preparing a polymer composite membrane, comprising the following steps:

S1: providing a porous base membrane;

S2: preparing a spinning solution containing a first polymeric material and a second polymeric material, and forming a heat-resistant fiber layer on at least one side surface of the porous base membrane through electrostatic spinning by using the spinning solution, wherein the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%; and S3: forming a bonding layer on at least one side surface of the polymer composite membrane, the bonding layer comprising:

an acrylate crosslinked polymer, a styrene-acrylate crosslinked copolymer and a vinylidene fluoride-hexafluoropropylene copolymer, or an acrylate crosslinked polymer and a styrene acrylate crosslinked copolymer, or an acrylate crosslinked polymer and a vinylidene fluoride-hexafluoropropylene copolymer, and the porosity of the bonding layer is 40% to 65%; and wherein:

the glass transition temperature of the acrylate crosslinked polymer is −20° C. to 60° C., the glass transition temperature of the styrene-acrylate crosslinked copolymer is −30° C. to 50° C., and the glass transition temperature of the vinylidene fluoride-hexafluoropropylene copolymer is −65° C. to −40° C.

a liquid absorption rate of the first polymeric material in an electrolyte at 25° C. is below 5% and has an error of ±5%;

the glass transition temperature of the first polymeric material is above 100° C.;

the melting point of the second polymeric material is 100° C. to 150° C.; and optionally, the glass transition temperature of the second polymeric material is below 25° C.; and a liquid absorption rate of the second polymeric material in an electrolyte at 25° C. is 40% to 100% and has an error of ±5%.

* * * * *